United States Patent
Miyanishi et al.

(10) Patent No.: US 9,644,511 B2
(45) Date of Patent: May 9, 2017

(54) COMBUSTION GAS COOLING APPARATUS, DENITRATION APPARATUS INCLUDING THE COMBUSTION GAS COOLING APPARATUS, AND COMBUSTION GAS COOLING METHOD

(75) Inventors: Hideo Miyanishi, Tokyo (JP); Yasuyuki Kuroda, Tokyo (JP); Rand Drake, Newport Beach, CA (US); Albert Bednarski, Newport Beach, CA (US); Paul Harris, Canton, MI (US); James Paul, Carmel, CA (US); Kevin Linfield, Amherstburg (CA)

(73) Assignees: MITSUBISHI HITACHI POWER SYSTEMS, LTD., Yokohama-shi (JP); MITSUBISHI HITACHI POWER SYSTEMS AMERICAS, INC., Lake Mary, FL (US)

( * ) Notice: Subject to any disclaimer, the term of this patent is extended or adjusted under 35 U.S.C. 154(b) by 0 days.

(21) Appl. No.: 14/418,006

(22) PCT Filed: Sep. 6, 2012

(86) PCT No.: PCT/US2012/053879
§ 371 (c)(1),
(2), (4) Date: Jul. 29, 2015

(87) PCT Pub. No.: WO2014/039040
PCT Pub. Date: Mar. 13, 2014

(65) Prior Publication Data
US 2015/0330274 A1    Nov. 19, 2015

(51) Int. Cl.
*F01N 3/02* (2006.01)
*F01N 3/10* (2006.01)
(Continued)

(52) U.S. Cl.
CPC ....... *F01N 3/0205* (2013.01); *B01D 53/8631* (2013.01); *F01N 3/2066* (2013.01);
(Continued)

(58) Field of Classification Search
CPC .... F01N 3/0205; F01N 3/2066; F01N 13/082; B01D 53/8631; B01D 2251/2062;
(Continued)

(56) References Cited

U.S. PATENT DOCUMENTS 1,805,093 A    5/1931   Holzwarth
4,950,473 A    8/1990   Flockenhaus et al.
(Continued)

FOREIGN PATENT DOCUMENTS

JP    01-281322 A    11/1989
JP    04-004021 A    1/1992
(Continued)

OTHER PUBLICATIONS

International Search Report dated Nov. 15, 2012, issued in corresponding Internationa Application No. PCT/US2012/53879 (2 pages).
(Continued)

*Primary Examiner* — Nicholas J Weiss
*Assistant Examiner* — Dapinder Singh
(74) *Attorney, Agent, or Firm* — Westerman, Hattori, Daniels & Adrian, LLP

(57) ABSTRACT

A fuel gas cooling apparatus includes a cooling duct which causes a cooling gas to flow out into a mixing duct, and a difference of maximum dimensions in a height direction of a flow inlet and a flow outlet with respect to a passage length of the mixing duct is smaller than a difference of maximum dimensions in the height direction of a flow inlet and a flow outlet with respect to a passage length of an expanded duct, or a difference of maximum dimensions in a width direction
(Continued)

of the flow inlet and the flow outlet with respect to the passage length of the mixing duct is smaller than a difference of maximum dimensions in the width direction of the flow inlet and the flow outlet with respect to the passage length of the expanded duct.

17 Claims, 12 Drawing Sheets

(51) Int. Cl.
  *F01N 3/20* (2006.01)
  *F01N 13/08* (2010.01)
  *B01D 53/86* (2006.01)

(52) U.S. Cl.
  CPC ............... *B01D 2251/2062* (2013.01); *B01D 2255/20707* (2013.01); *B01D 2255/20723* (2013.01); *B01D 2255/20776* (2013.01); *B01D 2257/404* (2013.01); *F01N 13/082* (2013.01)

(58) Field of Classification Search
  CPC .......... B01D 2255/20707; B01D 2255/20723; B01D 2255/20776; B01D 2257/404
  USPC .................................. 60/286, 289, 290, 320
  See application file for complete search history.

(56) References Cited

U.S. PATENT DOCUMENTS

| | | | |
|---|---|---|---|
| 5,000,098 A | | 3/1991 | Ikeda et al. |
| 5,128,004 A | * | 7/1992 | Nevels ................... B09C 1/067 205/705 |
| 5,555,718 A | | 9/1996 | Anderson et al. |
| 5,651,253 A | | 7/1997 | Althaus et al. |
| 6,553,770 B2 | | 4/2003 | Tisdale et al. |
| 7,069,716 B1 | | 7/2006 | Childers |
| 7,721,543 B2 | | 5/2010 | Massey et al. |
| 7,841,323 B2 | | 11/2010 | Eibl et al. |
| 2010/0024379 A1 | | 2/2010 | Sengar et al. |
| 2010/0205927 A1 | | 8/2010 | Eiteneer et al. |
| 2010/0316492 A1 | | 12/2010 | Charron et al. |
| 2011/0158876 A1 | | 6/2011 | Buzanowski et al. |
| 2011/0283676 A1 | * | 11/2011 | Reichelderfer ......... F01N 3/323 60/274 |
| 2011/0306254 A1 | * | 12/2011 | Woods ................... B63H 21/32 440/89 C |
| 2011/0308236 A1 | * | 12/2011 | Raasch ................... F01N 1/084 60/317 |

FOREIGN PATENT DOCUMENTS

| | | |
|---|---|---|
| JP | 08-108045 A | 4/1996 |
| JP | 2004-308949 A | 11/2004 |
| JP | 2010-31869 | 2/2010 |
| JP | 2011-38517 | 2/2011 |

OTHER PUBLICATIONS

Written Opinion dated Nov. 15, 2012, issued in corresponding Internationa Application No. PCT/US2012/53879 (6 pages).

Office Action dated Jan. 5, 2016, issued in counterpart Japanese Patent Application No. 2015-526510, with English translation. (12 pages).

Notification Concerning Transmittal of International Preliminary Report on Patent Ability of International Application No. PCT/US2012/053879 mailed Mar. 19, 2015 with Forms PCT/IB/373 and PCT/ISA/237 (8 pages).

A Decision to Grant a Patent, dated Aug. 9, 2016, issued in counterpart Japanese Patent Application No. 2015-526510. Explanation of relevance: "The Decision to Grant a Patent has been received". (3 pages).

* cited by examiner

COMBUSTION GAS COOLING APPARATUS, DENITRATION APPARATUS INCLUDING THE COMBUSTION GAS COOLING APPARATUS, AND COMBUSTION GAS COOLING METHOD

TECHNICAL FIELD

The present invention relates to a combustion gas cooling apparatus, a denitration apparatus including the combustion gas cooling apparatus, and a combustion gas cooling method.

BACKGROUND ART

Conventionally, a denitration apparatus decomposing nitrogen oxides contained in a combustion gas discharged from a combustion engine such as a gas turbine, and preventing an adverse effect on an atmospheric environment has been known. Further, it is known that when the combustion gas with temperature exceeding allowable temperature flows into the denitration apparatus including a catalyst part which decomposes nitrogen oxides, performance degradation of the denitration apparatus, or a failure of the denitration apparatus occurs. There is known a denitration apparatus in which a cooling apparatus which cools a combustion gas is installed at an upstream side of a catalyst part in order to prevent the troubles like this (refer to, for example, Patent Literature 1). As methods for cooling a combustion gas, a method for transferring thermal energy of a combustion gas to a cooling medium and a method for mixing a cooling medium and a combustion gas are known.

CITATION LIST

Patent Literature

{PTL 1}
Japanese Unexamined Patent Application, Publication No. Hei 1-281322

SUMMARY OF INVENTION

Technical Problem

However, the cooling apparatus disclosed in Patent Literature 1 is not intended to mix a cooling medium and a combustion gas, but supplies the cooling medium which recovers heat from the combustion gas to a waste heat recovery boiler. Accordingly, as compared with the cooling apparatus with a method which mixes a cooling medium and a combustion gas, a sufficient cooling cannot be achieved.

Further, when a cooling medium is mixed with a combustion gas, it is required that the cooling medium and the combustion gas are sufficiently mixed to make the temperature distribution of the mixed gas uniform.

The present invention is made in the light of the circumstances as above, and has an object to provide a combustion gas cooling apparatus, a denitration apparatus including the combustion gas cooling apparatus, and a combustion gas cooling method, which reduce a pressure loss through a catalyst part while enabling cooling with a temperature distribution of a gas which is supplied to the catalytic part that decomposes nitrogen oxides being made sufficiently uniform.

Solution to Problem

In order to attain the above described objective, the present invention adopts the following means.

A combustion gas cooling apparatus according to the present invention has a first duct including a first flow inlet into which a combustion gas travels, and a first flow outlet which allows the combustion gas traveling in from the first flow inlet to exhaust, a cooling duct which introduces a cooling gas to the first duct at a temperature lower than the combustion gas, and generates a mixed gas in which the combustion gas and the cooling gas are mixed, and a second duct including a second flow inlet into which is connected to the first duct to introduce the mixed gas, and a second flow outlet which allows the mixed gas traveling in from the second flow inlet to exhaust, wherein a difference of maximum dimensions in a first direction of the first flow inlet and the first flow outlet with respect to a passage length of the first duct is smaller than a difference of maximum dimensions in the first direction of the second flow inlet and the second flow outlet with respect to a passage length of the second duct, and/or a difference of maximum dimensions in a second direction, which is substantially orthogonal to the first direction, of the first flow inlet and the first flow outlet with respect to the passage length of the first duct is smaller than a difference of maximum dimensions in the second direction of the second flow inlet and the second flow outlet with respect to the passage length of the second duct.

In the combustion gas cooling apparatus according to the present invention, when the difference of the maximum dimensions in the first direction of the first flow inlet and the first flow outlet with respect to the passage length of the first duct is smaller than the difference of the maximum dimensions in the first direction of the second flow inlet and the second flow outlet with respect to the passage length of the second duct, less flow-separation and less flow-maldistribution of the stream of the combustion gas in the first duct occurs as compared with the case in which the differences are equal, and mixing of the combustion gas and the cooling gas is made uniform, and therefore, cooling can be performed with a temperature distribution of the combustion gas being made sufficiently uniform. Further, the cross-sectional area of the flow outlet of the second duct is sufficiently large, and therefore, the gas flows at a lower rate so that a pressure loss can be reduced when the catalyst part which decomposes nitrogen oxides is installed.

Similarly, in the combustion gas cooling apparatus according to the present invention, when the difference of the maximum dimensions in the second direction, which is substantially orthogonal to the first direction, of the first flow inlet and the first flow outlet with respect to the passage length of the first duct is smaller than the difference of the maximum dimensions in the second direction of the second flow inlet and the second flow outlet with respect to the passage length of the second duct, less flow-separation and less flow-maldistribution of the stream of the combustion gas in the first duct occurs as compared with the case in which the differences are equal, and mixing of the combustion gas and the cooling gas is made uniform, and therefore, cooling can be performed with a temperature of the combustion gas being made sufficiently uniform. Further, the cross-sectional area of the flow outlet of the second duct is sufficiently large, and therefore, the gas flows at a lower rate so that a pressure loss can be reduced when the catalyst part which decomposes nitrogen oxides is installed.

Further, in the combustion gas cooling apparatus of a first aspect of the present invention, the difference of the maximum dimensions in the first direction of the first flow inlet and the first flow outlet with respect to the passage length of the first duct is smaller than the difference of the maximum dimensions in the first direction of the second flow inlet and the second flow outlet with respect to the passage length of the second duct, and the difference of the maximum dimensions in the second direction of the first flow inlet and the first flow outlet with respect to the passage length of the first duct is equal to the difference of the maximum dimensions in the second direction of the second flow inlet and the second flow outlet with respect to the passage length of the second duct.

According to the combustion gas cooling apparatus of the first aspect of the present invention, the difference of the maximum dimensions in the first direction of the first flow inlet and the first flow outlet with respect to the passage length of the first duct is smaller than the difference of the maximum dimensions in the first direction of the second flow inlet and the second flow outlet with respect to the passage length of the second duct. Therefore, less flow-separation and less flow-maldistribution of the stream of the combustion gas in the first duct occurs, mixing of the combustion gas and the cooling gas is made uniform, and cooling can be performed with the temperature distribution of the gas which is supplied to the catalyst part that decomposes nitrogen oxides being made sufficiently uniform. Further, the cross-sectional area of the flow outlet of the second duct is sufficiently large, and therefore, the gas flows at a lower rate so that the pressure loss in the catalyst part can be reduced.

Further, in the combustion gas cooling apparatus of the first aspect of the present invention, a maximum dimension in the first direction of the first duct from the first flow inlet to the first flow outlet may be constant. In this manner, cooling can be performed with the temperature distribution of the combustion gas being made sufficiently uniform while the maximum dimension in the first direction of the first duct is made constant. Further, the cross-sectional area of the flow outlet of the second duct is sufficiently large, and the gas flows at a lower rate so that the pressure loss in the catalyst part can be reduced.

Further, in the combustion gas cooling apparatus of the first aspect of the present invention, a plurality of the cooling ducts may be installed at intervals in the first direction. In this manner, the cooling efficiency of the combustion gas is enhanced, and cooling can be performed with the temperature distribution of the gas which is supplied to the catalyst part that decomposes nitrogen oxides being made sufficiently uniform.

Further, in the combustion gas cooling apparatus of a second aspect of the present invention, the difference of the maximum dimensions in the first direction of the first flow inlet and the first flow outlet with respect to the passage length of the first duct is equal to the difference of the maximum dimensions in the first direction of the second flow inlet and the second flow outlet with respect to the passage length of the second duct, and the difference of the maximum dimensions in the second direction of the first flow inlet and the first flow outlet with respect to the passage length of the first duct is smaller than the difference of the maximum dimensions in the second direction of the second flow inlet and the second flow outlet with respect to the passage length of the second duct.

According to the combustion gas cooling apparatus of the second aspect of the present invention, the difference of the maximum dimensions in the second direction of the first flow inlet and the first flow outlet with respect to the passage length of the first duct is smaller than the difference of the maximum dimensions in the second direction of the second flow inlet and the second flow outlet with respect to the passage length of the second duct. Therefore, less flow-separation and less flow-maldistribution of the stream of the combustion gas in the first duct occurs, mixing of the combustion gas and the cooling gas is made uniform, and cooling can be performed with the temperature distribution of the gas which is supplied to the catalyst part that decomposes nitrogen oxides being made sufficiently uniform. Further, the cross-sectional area of the flow outlet of the second duct is sufficiently large, and therefore, the gas flows at a lower rate so that the pressure loss in the catalyst part can be reduced.

Further, in the combustion gas cooling apparatus of the second aspect of the present invention, a dimension in the second direction of the first duct from the first flow inlet to the first flow outlet may be constant. In this manner, cooling can be performed with the temperature distribution of the gas which is supplied to the catalyst part that decomposes nitrogen oxides being made sufficiently uniform, while the dimension in the second direction of the first duct is made constant. Further, the cross-sectional area of the flow outlet of the second duct is sufficiently large, and the gas flows at a lower rate so that the pressure loss in the catalyst part can be reduced.

Further, in the combustion gas cooling apparatus of the second aspect of the present invention, a plurality of the cooling ducts may be installed at intervals in the second direction. In this manner, the cooling efficiency of the combustion gas is enhanced, and cooling can be performed with the temperature distribution of the gas which is supplied to the catalyst part that decomposes nitrogen oxides being made sufficiently uniform.

In the combustion gas cooling apparatus of a third aspect of the present invention, a center position in the first direction of the second flow outlet is higher than a center position in the first direction of the first flow outlet. In this manner, the combustion gas cooling apparatus can be provided, in which an outer wall surface of any one of the first duct and the second duct is disposed on the same plane.

In the combustion gas cooling apparatus of a fourth aspect of the present invention, a center position in the first direction of the second flow outlet corresponds to a center position in the first direction of the first flow outlet. In this manner, the center position in the first direction of the second flow outlet and the center position in the first direction of the first flow outlet are caused to correspond to each other, and nonuniformity of the velocity distribution of the mixed gas which flows in the second duct can be reduced.

In the combustion gas cooling apparatus of a fifth aspect of the present invention, a temperature of the combustion gas which flows into the first flow inlet is 500° C. or higher.

In the combustion gas cooling apparatus of a sixth aspect of the present invention, as the cooling gas which is introduced to the first duct from the cooling duct, air in atmosphere is used.

A denitration apparatus according to the present invention includes the combustion gas cooling apparatus, and has a catalyst part which is provided downstream of the second duct, decomposes nitrogen oxides contained in the mixed gas exhausted from the second duct, and discharges the mixed gas in which the nitrogen oxides are decomposed, wherein temperature of the mixed gas at an inlet of the catalyst part is 300° C. to 500° C. inclusive.

A combustion gas cooling method according to the present invention includes the steps of introducing a combustion gas to flow into a first duct including a first flow inlet into which the combustion gas travels, and a first flow outlet which allows the combustion gas flowing in from the first flow inlet to exhaust, injecting a cooling gas from a cooling duct which causes the cooling gas at a temperature lower than the combustion gas to flow out into the first duct, and generating a mixed gas in which the combustion gas and the cooling gas are mixed so that temperature of the mixed gas falls within a predetermined temperature range; and introducing the mixed gas to flow into a second duct which includes a second flow inlet into which the mixed gas exhausted from the first flow outlet of the first duct travels, and a second flow outlet which allows the mixed gas flowing in from the second flow inlet to exhaust, wherein a difference of maximum dimensions in a first direction of the first flow inlet and the first flow outlet with respect to a passage length of the first duct is smaller than a difference of maximum dimensions in the first direction of the second flow inlet and the second flow outlet with respect to a passage length of the second duct, and/or a difference of maximum dimensions in a second direction, which is substantially orthogonal to the first direction, of the first flow inlet and the first flow outlet with respect to the passage length of the first duct is smaller than a difference of maximum dimensions in the second direction of the second flow inlet and the second flow outlet with respect to the passage length of the second duct.

When the difference of the maximum dimensions in the first direction of the first flow inlet and the first flow outlet with respect to the passage length of the first duct is smaller than the difference of the maximum dimensions in the first direction of the second flow inlet and the second flow outlet with respect to the passage length of the second duct, less flow-separation and less flow-maldistribution of the stream of the combustion gas in the first duct occurs as compared with the case in which the differences are equal, and mixing of the combustion gas and the cooling gas is made uniform, and therefore, cooling can be performed with a temperature distribution of the gas which is supplied to the catalyst part that decomposes nitrogen oxides being made sufficiently uniform. Further, the cross-sectional area of the flow outlet of the second duct is sufficiently large, and therefore, the gas flows at a lower rate so that a pressure loss can be reduced when the catalyst part which decomposes nitrogen oxides is installed.

Similarly, when the difference of the maximum dimensions in the second direction of the first flow inlet and the first flow outlet with respect to the passage length of the first duct is smaller than the difference of the maximum dimensions in the second direction of the second flow inlet and the second flow outlet with respect to the passage length of the second duct, less flow-separation and less flow-maldistribution of the stream of the combustion gas in the first duct occurs as compared with the case in which the differences are equal, and mixing of the combustion gas and the cooling gas is made uniform. Therefore, cooling can be performed with the temperature distribution of the gas which is supplied to the catalyst part that decomposes nitrogen oxides being made sufficiently uniform. Further, the cross-sectional area of the flow outlet of the second duct is sufficiently large, and therefore, the gas flows at a lower rate so that a pressure loss in the case of the catalyst part which decomposes nitrogen oxides being installed can be reduced.

Advantageous Effects of Invention

According to the present invention, the combustion gas cooling apparatus, the denitration apparatus including the combustion gas cooling apparatus, and the combustion gas cooling method can be provided, which reduces the pressure loss in the catalyst part that decomposes nitrogen oxides while enabling cooling with the temperature distribution of the gas which is supplied to the catalyst part that decomposes nitrogen oxides being made sufficiently uniform.

DESCRIPTION OF EMBODIMENTS

First Embodiment

Figure 1:
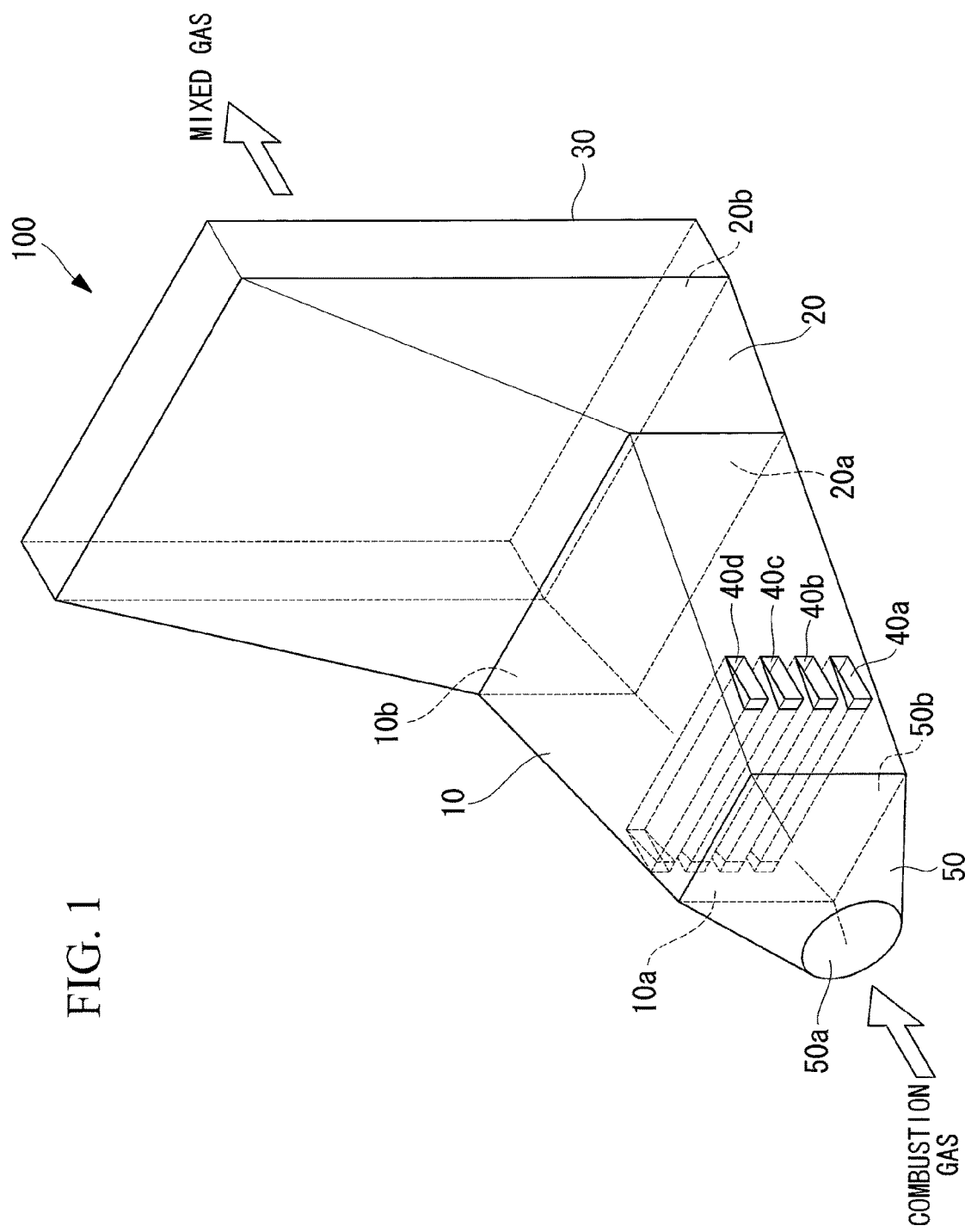
FIG. 1 is a perspective view of a combustion gas cooling apparatus of a first embodiment.
Figure 2:
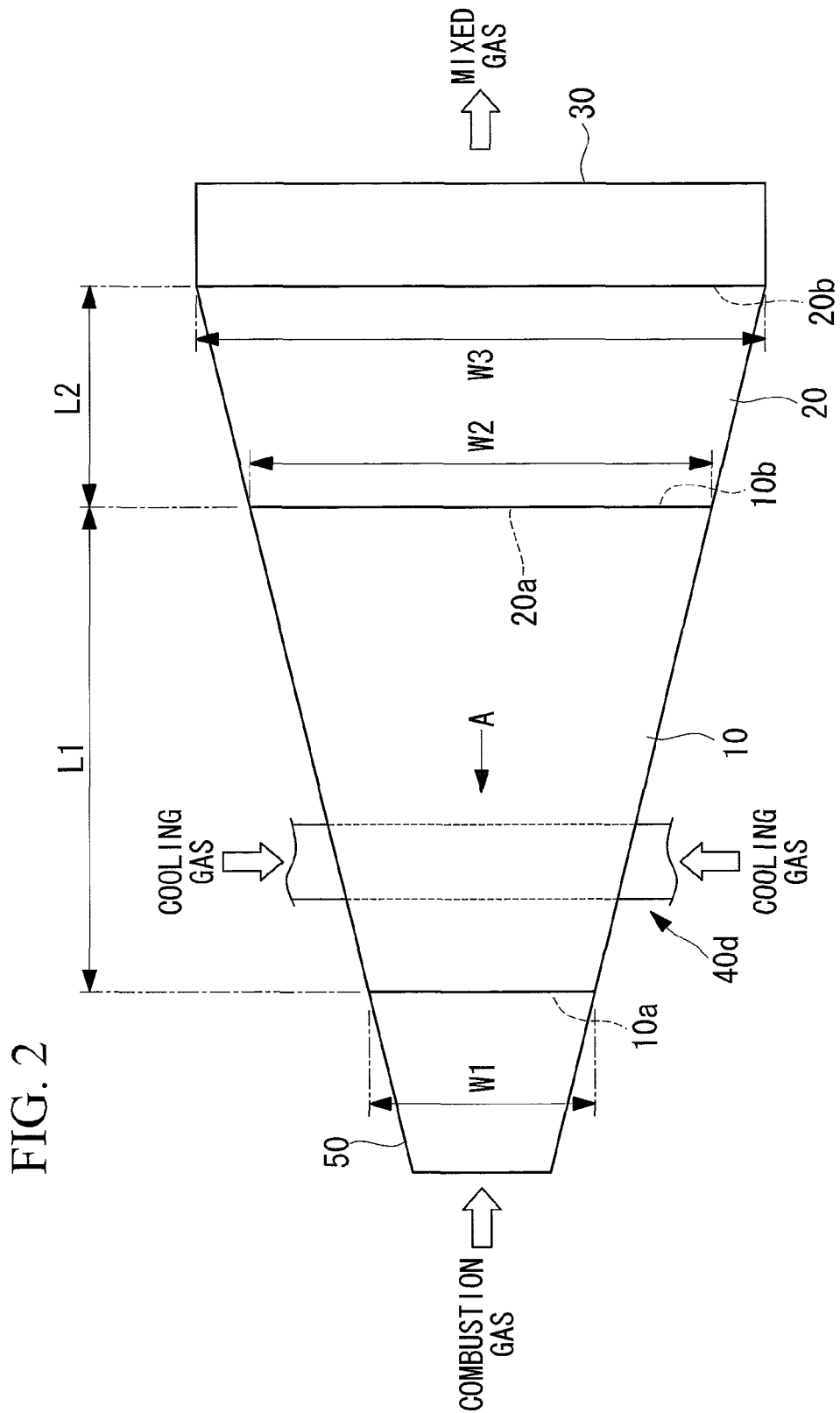
FIG. 2 is a plan view of the combustion gas cooling apparatus of the first embodiment seen from above.
Figure 3:
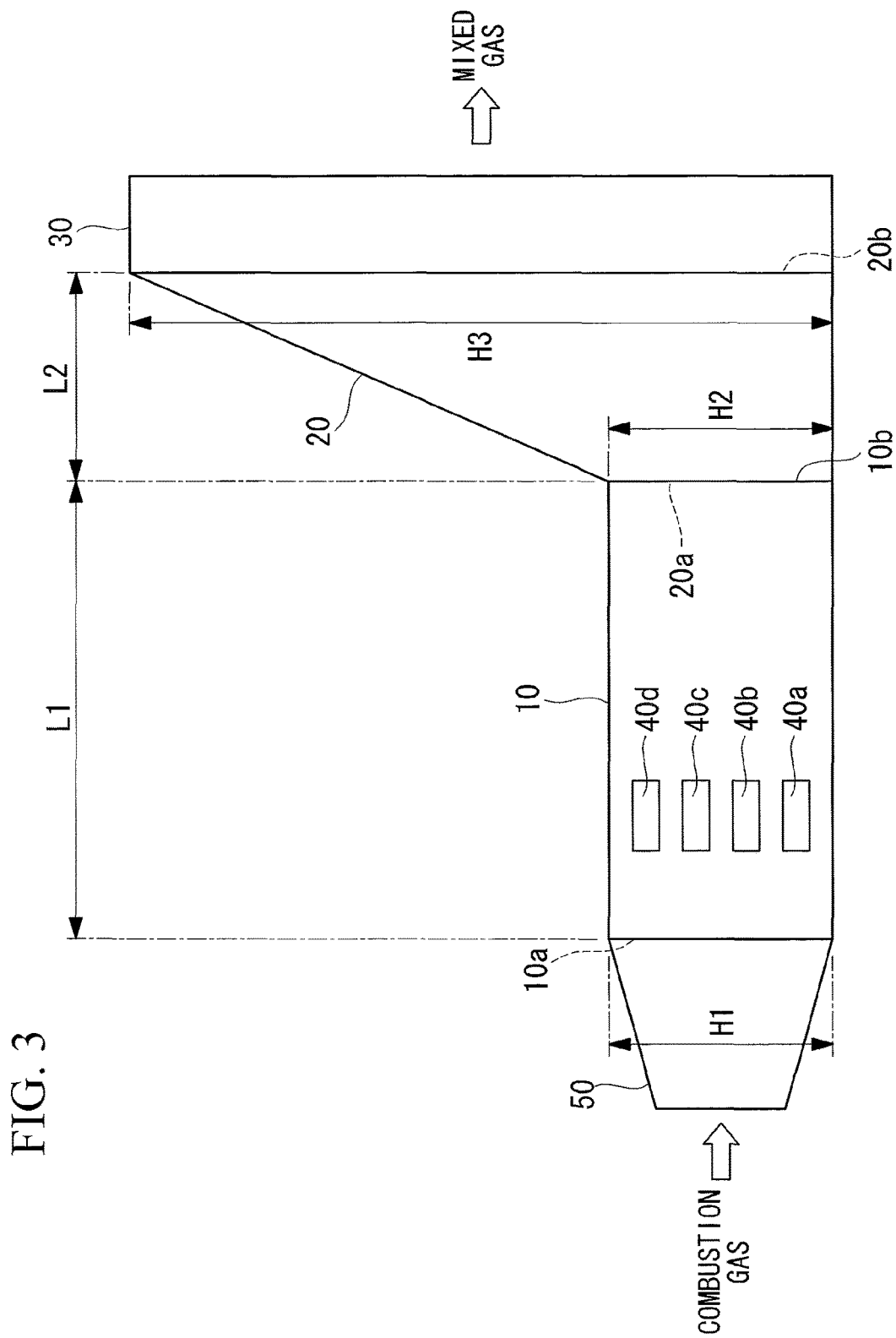
FIG. 3 is a side view of the combustion gas cooling apparatus of the first embodiment seen from a right side.
Figure 12:
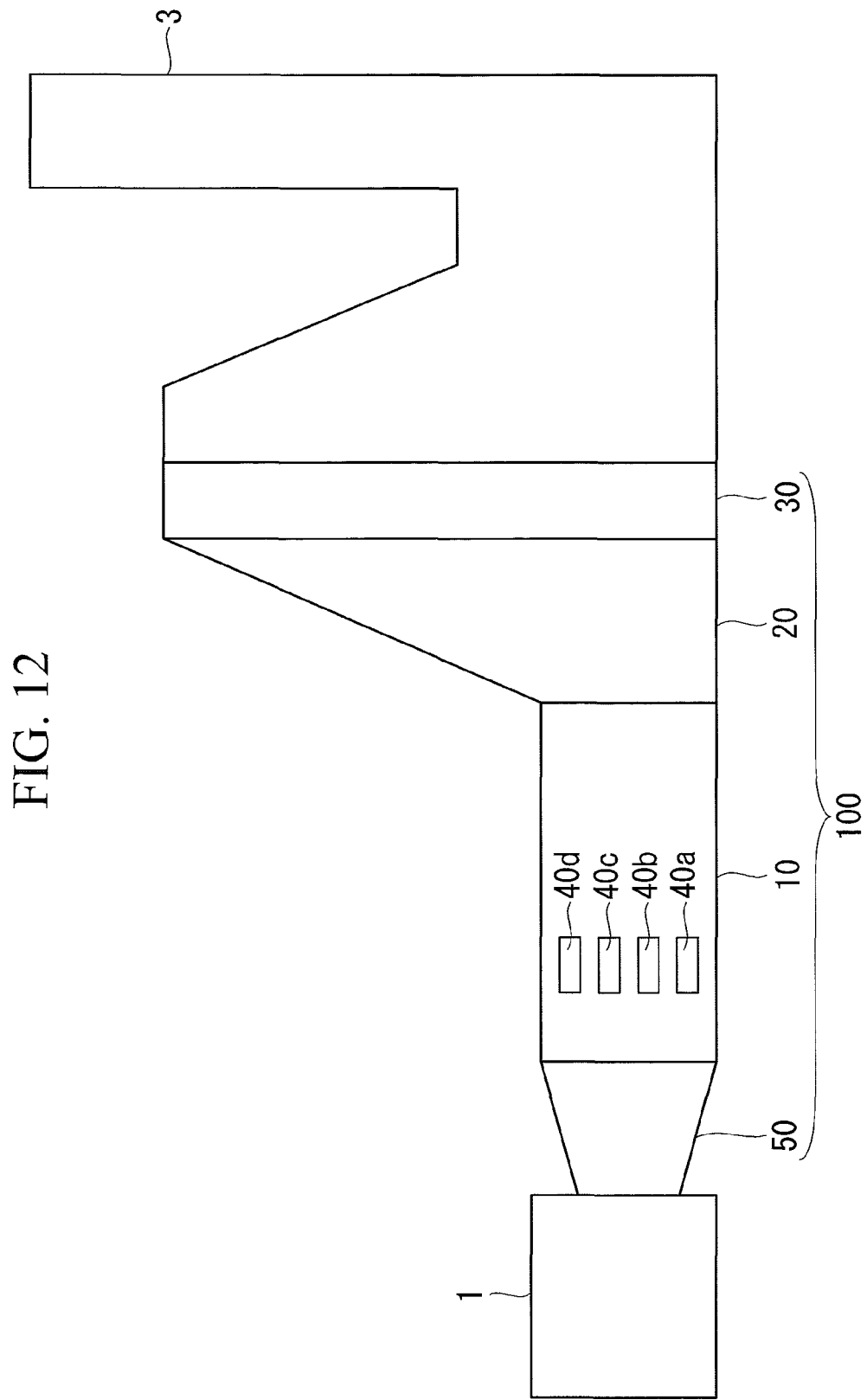
FIG. 12 is a side view of a gas turbine system including the combustion gas cooling apparatus of the first embodiment.

Hereinafter, a combustion gas cooling apparatus of a first embodiment will be described with use of FIG. 1 to FIG. 3 and FIG. 12. FIG. 1 is a perspective view of a combustion gas cooling apparatus 100 of the first embodiment. FIG. 2 is a plan view of the combustion gas cooling apparatus 100 seen from above. FIG. 3 is a side view of the combustion gas cooling apparatus 100 seen from a right side. FIG. 12 is a side view of a gas turbine system including the combustion gas cooling apparatus 100. In FIG. 1 to FIG. 3 and FIG. 12, the components assigned with the same reference signs have the same configurations. Further, the arrows in FIG. 1 to FIG. 3 indicate flow directions of gases (a combustion gas, a mixed gas).

As shown in FIG. 12, the combustion gas cooling apparatus 100 of the first embodiment is an apparatus which causes a combustion gas (an exhaust gas) at a high temperature of 500° C. or higher which is generated by combustion in, for example, a gas turbine 1 to flow in from an inlet duct 50, mixes the combustion gas and a cooling gas in a mixing duct 10 to generate a mixed gas, and causes the mixed gas passing through an expanded duct 20 into a catalyst part 30. The catalyst part 30 decomposes nitrogen oxides contained in the mixed gas, and discharges the mixed gas in which the nitrogen oxides are decomposed into an outside (atmosphere) of the gas turbine system including the combustion gas cooling apparatus 100 via a stack 3 provided at a rear stream side. Further, in the combustion gas cooling apparatus 100, cooling is preferably performed until the temperature becomes a temperature of 300° C. to 500° C. inclusive at which the activation of a catalyst is high in the catalyst part 30, and which is suitable for decomposition processing of the nitrogen oxides contained in the mixed gas. In order to achieve uniformity of the temperature of the mixed gas which is supplied to the catalyst part 30, the temperature distribution of the mixed gas is preferably contained in a range in which a difference of the highest temperature and the lowest temperature is 10° C. or less.

The inlet duct 50 is formed from a metal material or any heat resistant material such as iron, and functions as a flow passage of the combustion gas. The inlet duct 50 includes a flow inlet 50a into which the combustion gas discharged from the gas turbine flows, and a flow outlet 50b from which the combustion gas which flows into the flow inlet 50a flows out. A sectional shape in a direction orthogonal to an inflow direction of the combustion gas (arrow direction in FIG. 1) of the flow inlet 50a is, for example, substantially circular. Meanwhile, a sectional shape in the direction orthogonal to the inflow direction of the combustion gas (arrow direction in FIG. 1) of the flow outlet 50b is substantially a square, for example. The inlet duct 50 is in a shape in which a sectional area in the direction orthogonal to the inflow direction of the combustion gas (arrow direction in FIG. 1) gradually expands toward the flow outlet 50b from the flow inlet 50a. For example, a flow velocity of the combustion gas discharged from the gas turbine in the inlet duct 50 is 50 m/s to 100 m/s.

The mixing duct (first duct) 10 is formed from a metal material such as iron, and functions as a flow passage of the mixed gas in which the combustion gas and the cooling gas are mixed. The mixing duct 10 includes a flow inlet (first flow inlet) 10a into which the combustion gas discharged from the flow outlet 50b of the inlet duct 50 flows, and a flow outlet (first flow outlet) 10b from which the combustion gas flowing in from the flow inlet 10a flows out. A sectional shape in a direction orthogonal to an inflow direction of the combustion gas (arrow direction in FIG. 1) of the flow inlet 10a is a square. A sectional shape in the direction orthogonal to the inflow direction of the combustion gas (arrow direction in FIG. 1) of the flow outlet 10b is a rectangle with a wide width. The flow inlet 10a of the mixing duct 10 is in the same shape as the flow outlet 50b of the inlet duct 50, and is connected thereto so that leakage of the combustion gas does not occur. The sectional shapes of the flow inlet 10a and the flow outlet 10b are not limited to a square and a rectangle, but may be an ellipse, a circular shape and the like.

The cooling duct 40 is formed from a metal material such as iron, and causes a cooling gas at a temperature lower than the combustion gas to flow into the mixing duct 10, and generates the mixed gas in which the combustion gas and the cooling gas are mixed. In the first embodiment, for example, four cooling ducts (40a, 40b, 40c and 40d in sequence from a lower side) are disposed at intervals in a height direction (first direction) of the mixing duct 10. Note that the height direction (first direction) of the mixing duct 10 is a direction substantially orthogonal to a plane, for example a ground, on which ducts (the mixing duct 10, the expanded duct 20, and the inlet duct 50) are disposed. As the cooling gas, various gases having lower temperatures than the combustion gas can be used, and in the first embodiment, air in the atmosphere is used as the cooling gas. In the following description, when the four cooling ducts are described without being distinguished, the cooling ducts are described by being assigned with reference sign 40, and when each of the cooling ducts is described by being distinguished from the other ducts, the cooling duct is described by being assigned with any one of reference sign 40a, reference sign 40b, reference sign 40c and reference sign 40d.

As shown in FIG. 2, the cooling duct 40 includes cooling gas flow inlets in two directions substantially orthogonal to the flow direction of the combustion gas (arrow shown at the lower side in FIG. 2), and the cooling gas flows in from the two cooling gas flow inlets. Though not illustrated in FIG. 1 to FIG. 3, each of the two cooling gas flow inlets is connected to a coupling duct (not illustrated) which includes an air fan (not illustrated) inside the passage. The air fan causes the air in the atmosphere to flow into the inside of the coupling duct by power of drive of a motor or the like, and guides the air which functions as the cooling gas to the cooling gas flow inlet via the coupling duct.

Figure 4:
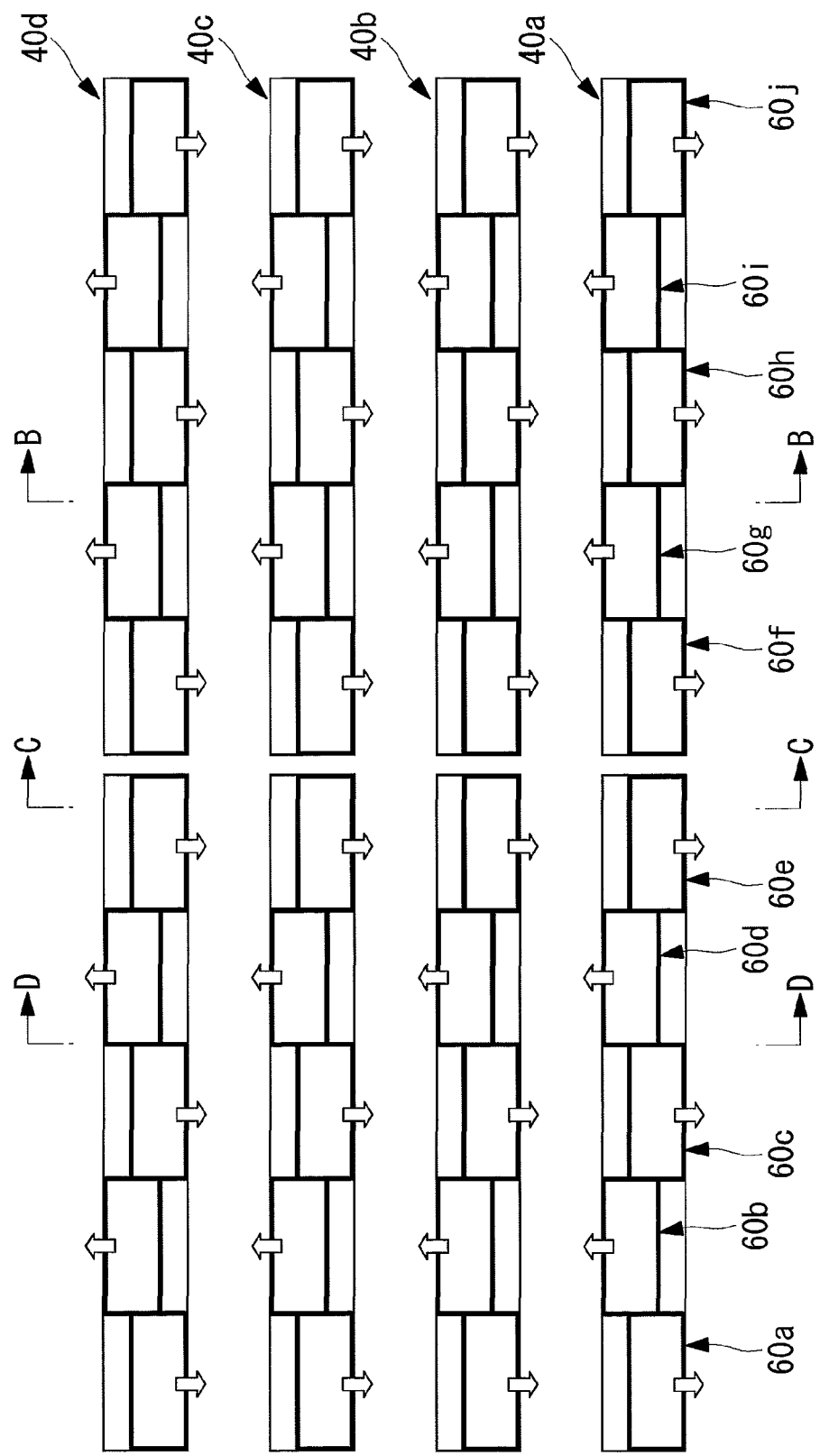
FIG. 4 is a view of a cooling duct 40 seen from an arrow A direction in FIG. 2.

Next, with use of FIG. 4, a plurality of cooling gas outflow apertures (cooling gas flow outlets) included by the cooling duct 40 will be described. FIG. 4 is a view of the cooling ducts 40 seen from the arrow A direction in FIG. 2. As shown in FIG. 4, the four cooling ducts 40a, 40b, 40c and 40d are disposed at constant intervals in the height direction of the mixing duct 10. Each of the cooling ducts 40 is fixed to a side wall surface of the mixing duct 10 by bolts or the like. Note that, the cooling ducts 40a, 40b, 40c, and 40d need not be disposed at constant intervals in the height direction, but may disposed at variable intervals.

Each of the cooling ducts 40 is provided with cooling gas outflow apertures 60 at, for example, ten spots in different positions in a lengthwise direction (width direction of the mixing duct 10) of the cooling duct 40. Explaining the cooling duct 40a, the cooling duct 40a is provided with the cooling gas outflow apertures at 10 spots of 60a to 60j in the different positions in the lengthwise direction of the cooling duct 40a. Among the cooling gas outflow apertures at the 10 spots, six cooling gas outflow apertures 60a, 60c, 60e, 60f, 60h and 60j are opened toward a lower side in the height direction of the mixing duct 10. Meanwhile, four cooling gas outflow apertures 60b, 60d, 60g and 60i are opened toward an upper side in the height direction of the mixing duct 10. Further, the cooling gas outflow apertures which are opened to the lower side in the height direction of the mixing duct 10 and the cooling gas outflow apertures which are opened to the upper side in the height direction of the mixing duct 10 are alternately disposed. By disposing the cooling gas outflow apertures in this manner, mixing of the cooling gas and the combustion gas is promoted, and the temperature distribution of the gas which is supplied to the catalyst part 30 can be further made uniform. Note that, the number of cooling gas outflow apertures which are opened toward the upper side in the height direction of the mixing duct 10 is not limited to four; the number of cooling gas outflow apertures which are opened toward the lower side in the height direction of the mixing duct 10 is not limited to six.

As shown by the arrows in FIG. 4, the cooling gas flows out toward the lower side in the height direction of the mixing duct 10 from the cooling gas outflow apertures which are opened toward the lower side in the height direction of the mixing duct 10. Meanwhile, the cooling gas flows out toward the upper side in the height direction of the mixing duct 10 from the cooling gas outflow apertures which are opened toward the upper side in the height direction of the mixing duct 10.

Figure 5:
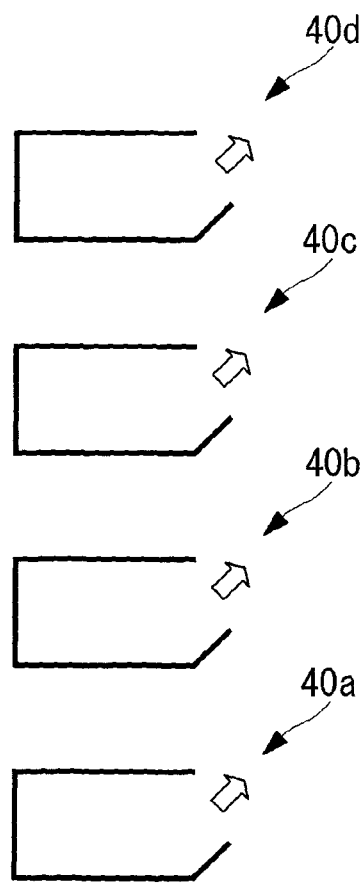
FIG. 5 is a B-B sectional view of the cooling duct shown in FIG. 4.
Figure 6:
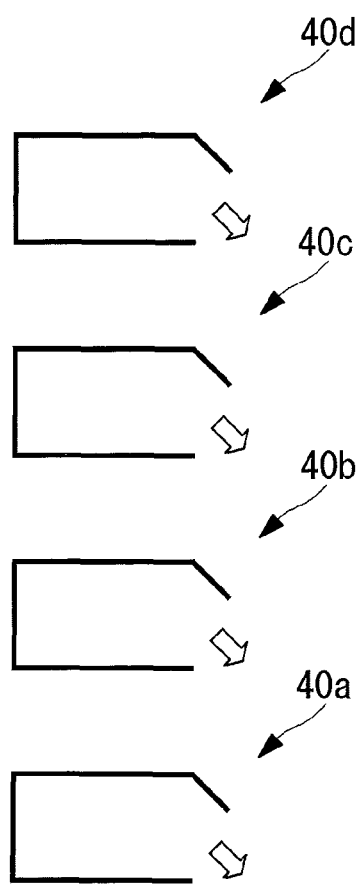
FIG. 6 is a C-C sectional view of the cooling duct shown in FIG. 4.
Figure 7:
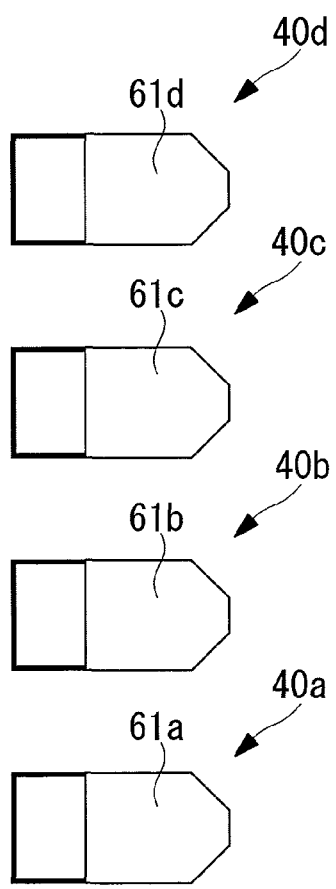
FIG. 7 is a D-D sectional view of the cooling duct shown in FIG. 4.

FIG. 5 is a B-B sectional view of the cooling ducts 40 shown in FIG. 4. FIG. 6 is a C-C sectional view of the cooling ducts 40 shown in FIG. 4. FIG. 7 is a D-D sectional view of the cooling ducts 40 shown in FIG. 4.

As shown in FIG. 5, the cooling gas flows out toward a diagonally upper side in the height direction of the mixing duct 10, from the cooling gas outflow apertures which are opened toward the upper side in the height direction of the mixing duct 10. The cooling gas which flows out includes a velocity component toward the upper side in the height direction of the mixing duct 10, and a velocity component toward a flow direction of the combustion gas (right direction in FIG. 5).

Further, as shown in FIG. 6, the cooling gas flows out toward a diagonally lower side in the height direction of the mixing duct 10, from the cooling gas outflow apertures which are opened toward the lower side in the height direction of the mixing duct 10. The cooling gas which flows out includes a velocity component toward the lower side in the height direction of the mixing duct 10, and a velocity component toward the flow direction of the combustion gas (right direction in FIG. 6).

As shown in FIG. 7, partition plates (61a to 61d) are disposed between the cooling gas outflow apertures which are opened toward the upper side in the height direction of the mixing duct 10 and the cooling gas outflow apertures which are opened toward the lower side in the height direction of the mixing duct 10. The partition plates distribute the cooling gases among the cooling gas outflow apertures 60c and 60d.

Next, the expanded duct (second duct) 20 will be described. The expanded duct 20 is formed from a metal material such as iron, and functions as a flow passage of the mixed gas in which the combustion gas and the cooling gas are mixed. The expanded duct 20 includes a flow inlet (second flow inlet) 20a into which the combustion gas which is discharged from the flow outlet 10b of the mixing duct 10 and a flow outlet (second flow outlet) 20b from which the combustion gas which flows into the flow inlet 20a flows out. A sectional shape in the direction orthogonal to the inflow direction of the combustion gas (arrow direction in FIG. 1) of the flow inlet 20a is a rectangle with a large width. A sectional shape in the direction orthogonal to the inflow direction of the combustion gas (arrow direction in FIG. 1) of the flow outlet 20b is a rectangle which is vertically longer. The flow inlet 20a of the mixing duct 10 is in the same shape as the flow outlet 10b of the mixing duct 10, and is connected thereto so that leakage of the mixed gas does not occur. The sectional shapes of the flow inlet 20a and the flow outlet 20b are not limited to a square and a rectangle, but may be an ellipse, a circular shape and the like.

The catalyst part 30 decomposes nitrogen oxides contained in the mixed gas, and discharges the mixed gas in which the nitrogen oxides are decomposed to an outside (in the atmosphere) of the combustion gas cooling apparatus 100. In the expanded duct 20, a blowing part (not illustrated) which blows a reducing agent for subjecting the mixed gas which passes through the catalyst part 30 to reduction reaction into the expanded duct 20 is disposed. The blowing part includes a passage in the shape of a pipe provided with, for example, a plurality of apertures, and ammonia which passes through the passage is blown into the expanded duct 20 through the plurality of apertures. Note that the cross-sectional shape of the pipe may be circle, square, rhomboid, hexagonal or other shape. Note that the ammonia is a typical example of a reducing agent; other kinds of reducing agents can also be employed. The mixed gas in which the reducing agent is blown by the blowing part flows into the catalyst part 30 via the flow outlet 20b of the expanded duct 20.

The catalyst part 30 functions as a denitration apparatus which decomposes the nitrogen oxides contained in the combustion gas into which the reducing agent is blown by the blowing part, into water and nitrogen. In the first embodiment, a selective catalyst reduction (SCR: Selective Catalytic Reduction) method which decomposes the nitrogen oxides by using ammonia as the reducing agent is used.

The catalyst part 30 is formed from a metal material or any heat resistant material such as iron, and functions as a flow passage of the mixed gas in which the combustion gas and the cooling gas are mixed, similarly to the mixing duct 10 and the expanded duct 20. The difference from the mixing duct 10 and the expanded duct 20 is that a plurality of catalyst packs (not illustrated) are disposed by being laid in the passage. The catalyst pack is a catalyst member in which the catalysts for causing the mixed gas to react with ammonia and decomposing the nitrogen oxides (nitrogen monoxide, nitrogen dioxide, and the like) in the exhaust gas into water and nitrogen are filled. The catalyst pack is configured by lattice-shaped or plate-shaped catalysts so that the mixed gas passes through an inside thereof. As for the components of the catalyst, $TiO_2$ is a main component, vanadium, tungsten and the like which are the activation components are added.

The temperature at which the catalyst promotes the reaction which decomposes the mixed gas into nitrogen and water is preferably 300° C. to 500° C. inclusive, and in particular, a range from 300° C. to 470° C. inclusive is more preferable. In the temperature region lower than 300° C., the activation of the catalyst becomes low, and a larger catalyst amount is needed to enhance denitration performance. Meanwhile, when the temperature is higher than 470° C., ammonia ($NH_3$) is oxidized, and with this, the problem arises, that ammonia ($NH_3$) is decreased and the denitration performance is reduced. Further, when the temperature is 500° C. or higher, not only the temperature is not suitable for reduction reaction, but also the temperature exceeds the heat resistant temperature of the catalyst itself, and the catalyst is likely to be broken. Accordingly, the temperature of the mixed gas which is supplied to the catalyst is desirably 500° C. or lower, and is particularly preferably in the range of 300° C. to 470° C. inclusive.

In the above, the configurations and the functions of the mixing duct 10, the expanded duct 20, the catalyst part 30, the cooling duct 40 and the inlet duct 50 which configure the combustion gas cooling apparatus 100 of the first embodiment are described. Next, the shapes of the mixing duct 10 and the expanded duct 20 which are important to cool the combustion gas with the temperature distribution of the combustion gas which flows into the catalyst part 30 being made sufficiently uniform will be described with use of FIG. 2 and FIG. 3.

As shown in FIG. 2 and FIG. 3, a passage length (length along the flow direction of the combustion gas) of the mixing duct 10 is L1, and a passage length (length along the flow direction of the combustion gas) of the expanded duct 20 is L2. Further, as shown in FIG. 3, a maximum dimension in a height direction (first direction) of the flow inlet 10a with respect to the passage length L1 of the mixing duct 10 is H1, and a maximum dimension in the height direction (first direction) of the flow outlet 10b with respect to the passage length L1 of the mixing duct 10 is H2. A maximum dimension in the height direction (first direction) of the flow inlet 20a with respect to the passage length L2 of the expanded duct 20 is H2, and a maximum dimension in the height direction (first direction) of the flow outlet 20b with respect to the passage length L2 of the expanded duct 20 is H3.

Further, as shown in FIG. 2, a maximum dimension in a horizontal width direction (second direction substantially orthogonal to the first direction) of the flow inlet 10a of an inner surface of the mixing duct 10 is W1, and a maximum dimension in the horizontal width direction (second direction) of the flow outlet 10b of the inner surface of the mixing duct 10 is W2. A maximum dimension in the horizontal width direction (second direction) of the flow inlet 20a of an inner surface of the expanded duct 20 is W2, and a maximum dimension in the horizontal width direction (second direction) of the flow outlet 20b of the expanded duct 20 is W3.

The shapes of the mixing duct 10 and the expanded duct 20 of the first embodiment are the shapes which satisfy the following conditional expression (1) or (1").

$$(H2-H1)/L1 < (H3-H2)/L2 \quad (1)$$

$$(H2-H1)/L1 < (H4''-H3'')/L2 \quad (1'')$$

In conditional expression (1"), H1 and H2 are as defined above; H3" is a maximum dimension in the height direction (first direction) of the flow inlet 20a with respect to the passage length L2 of the expanded duct 20, and H4" is a maximum dimension in the height direction (first direction) of the flow outlet 20b with respect to the passage length L2 of the expanded duct 20.

When the conditional expression (1) is satisfied, a difference (H2−H1) of the maximum dimensions in the height direction (first direction) of the flow inlet 10a and the flow outlet 10b with respect to the passage length L1 of the mixing duct 10 is smaller than a difference (H3−H2) of the maximum dimensions in the height direction (first direction) of the flow inlet 20a and the flow outlet 20b with respect to the passage length L2 of the expanded duct 20.

Figure 8:
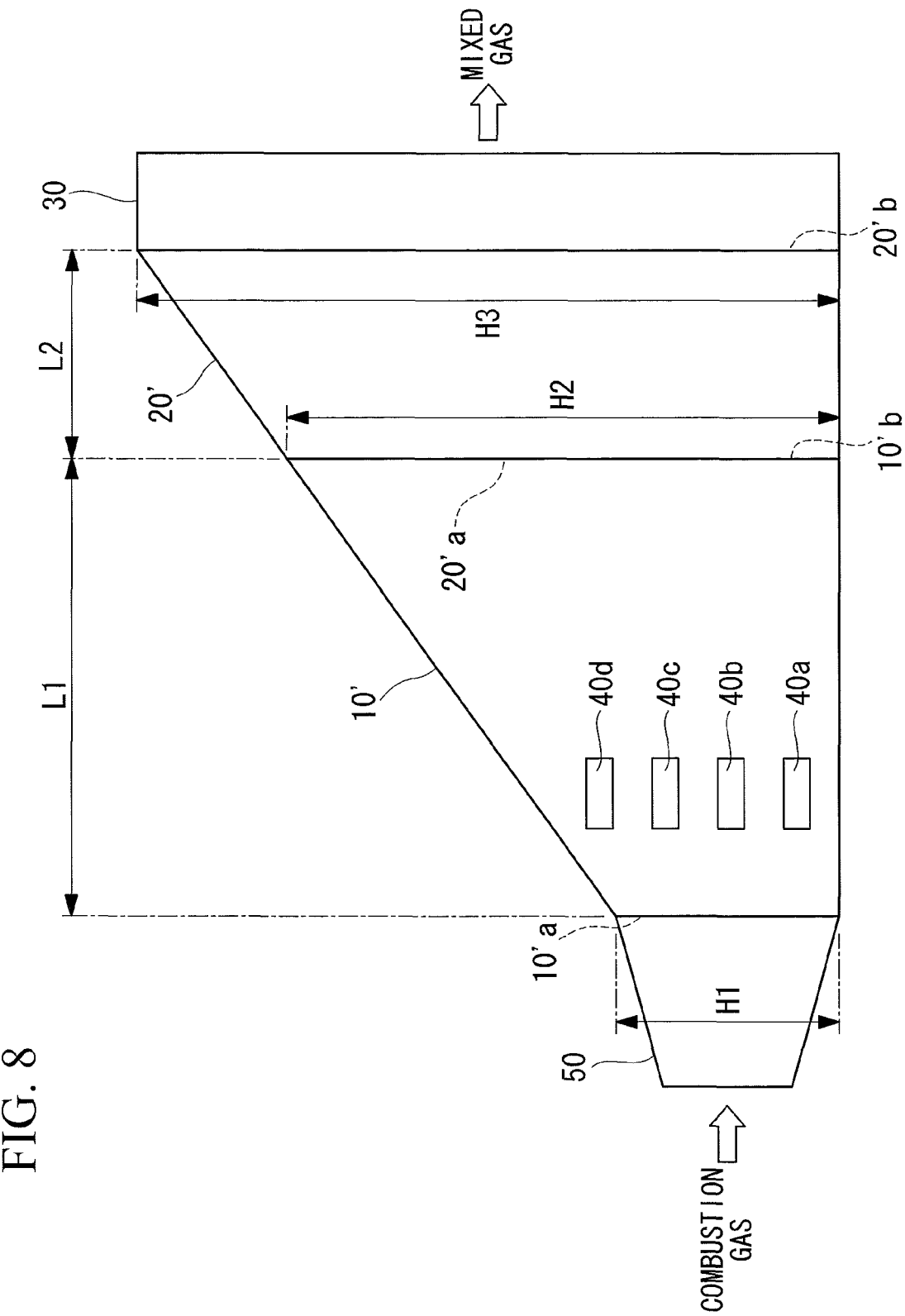
FIG. 8 is a side view of a combustion gas cooling apparatus of a comparative example seen from a right side.

Here, an effect which is provided by the shapes of the mixing duct 10 and the expanded duct 20 shown in FIG. 2 and FIG. 3 will be described in comparison with shapes of a mixing duct 10' and an expanded duct 20' of a combustion gas cooling apparatus 100' of a comparative example. A side view of the combustion gas cooling apparatus 100' of the comparative example is shown in FIG. 8. Here, the combustion gas cooling apparatus 100 shown in FIG. 3, and the combustion gas cooling apparatus 100' of the comparative example shown in FIG. 8 have the same configuration except for the shapes of the mixing ducts and the expanded ducts, and the disposing positions of the cooling ducts 40. Further, a plan view of the combustion gas cooling apparatus 100' of the comparative example seen from above is the same as the plan view of the combustion gas cooling apparatus 100 shown in FIG. 2, and the description thereof will be omitted. More specifically, the combustion gas cooling apparatus 100' of the comparative example has the same shape in the width direction as that of the combustion gas cooling apparatus 100 shown in FIG. 2 and FIG. 3, and has a shape in the height direction (first direction) different from that of the combustion gas cooling apparatus 100 shown in FIG. 2 and FIG. 3.

In the combustion gas cooling apparatus 100 the side view of which is shown in FIG. 3, the maximum dimension H2 in the height direction (first direction) of the flow inlet 20a with respect to the passage length L2 of the expanded duct 20, and the maximum dimension H1 in the height direction (first direction) of the flow inlet 10a with respect to the passage length L1 of the mixing duct 10 are equal to each other. Further, the maximum dimension H3 in the height direction (first direction) of the flow outlet 20b with respect to the passage length L2 of the expanded duct is larger than the maximum dimension H2 in the height direction (first direction) of the flow inlet 20a with respect to the passage length L2 of the expanded duct 20. Accordingly, the combustion gas cooling apparatus 100 the side view of which is shown in FIG. 3 satisfies the conditional expression (1).

Meanwhile, in the combustion gas cooling apparatus 100' of the comparative example the side view of which is shown in FIG. 8, the difference (H2−H1) of the maximum dimensions in the height direction (first direction) of the flow inlet 10a and the flow outlet 10b with respect to the passage length L1 of the mixing duct 10, and the difference (H3−H2) of the maximum dimensions in the height direction (first direction) of the flow inlet 20a and the flow outlet 20b with respect to the passage length L2 of the expanded duct 20 are equal to each other. Accordingly, the combustion gas cooling apparatus 100' of the comparative example the side view of which is shown in FIG. 8 does not satisfy the conditional expression (1).

As shown in FIG. 8, in the combustion gas cooling apparatus 100' of the comparative example which does not satisfy the conditional expression (1), the combustion gas which flows out from the inlet duct 50 passes through the ducts (the mixing duct 10' and the expanded duct 20') which increase in height with a constant gradient. In the mixing duct 10' in which the height increases with the constant gradient like this, flow-separation and flow-maldistribution of the stream of the combustion gas easily occurs as compared with the mixing duct 10 shown in FIG. 3. In other words, a separation of the stream of the combustion gas easily occurs when the combustion gas flows into the mixing duct 10' since the shape of the mixing duct 10' is rapidly expanded in the height direction (first direction) of the mixing duct 10'. Accordingly, mixing of the combustion gas and the cooling gas is not made sufficiently uniform. In contrast with this, in the combustion gas cooling apparatus 100 shown in FIG. 3, flow-separation and flow-maldistribution of the stream of the combustion gas hardly occurs in the mixing duct 10, mixing of the combustion gas and the cooling gas is made uniform, and therefore, cooling can be performed with the temperature of the mixed gas which is supplied to the catalyst part 30 that decomposes nitrogen oxides being made sufficiently uniform. Further, the cross-sectional area of the flow outlet 20b of the expanded duct 20 can be sufficiently large, and therefore, the gas flows at a lower rate so that a pressure loss in the catalyst part 30 can be reduced.

The inventor et al. performed comparative experiments on the combustion gas cooling apparatus 100 shown in FIG. 2 and FIG. 3, and the combustion gas cooling apparatus 100' of the comparative example shown in FIG. 8. As a result, in the combustion gas cooling apparatus 100' of the comparative example shown in FIG. 8, the temperature of the mixed gas which flowed into the catalyst part 30 varied depending on the regions, and the difference between the highest temperature and the lowest temperature was in the range from 30° C. to 45° C. In contrast with this, in the combustion gas cooling apparatus 100 shown in FIG. 2 and FIG. 3, the difference between the highest temperature and the lowest temperature was within the range of 10° C. or lower. Consequently, it is found out that according to the combustion gas cooling apparatus 100 shown in FIG. 2 and FIG. 3, mixing of the combustion gas and the cooling gas is sufficiently performed, and the temperature distribution is made uniform.

The combustion gas cooling apparatus 100 shown in FIG. 2 and FIG. 3 satisfies the conditional expression (1), but may have the shape which satisfies the following conditional expression (2) or (2") as well as the conditional expression (1), or instead of the conditional expression (1).

$$(W2-W1)/L1 < (W3-W2)/L2 \quad (2)$$

$$(W2-W1)/L1 < (W4''-W3'')/L2 \quad (2'')$$

In conditional expression (2"), W1 and W2 are as defined above; W3" is a maximum dimension in the horizontal width direction (second direction) of the flow inlet 20a of an inner surface of the expanded duct 20; and W4" is a maximum dimension in the horizontal width direction (second direction) of the flow outlet 20b of the expanded duct 20.

When the condition (2) is satisfied, a difference (W2−W1) of the maximum dimensions in the horizontal width direction of the flow inlet 10a and the flow outlet 10b of the inner surface of the mixing duct 10 is smaller than a difference (W3−W2) of the maximum dimensions in the horizontal width direction of the flow inlet 20a and the flow outlet 20b of the inner surface of the expanded duct 20.

In the mixing duct the width of which increases with a constant gradient, flow-separation and flow-maldistribution of the stream of the combustion gas easily occurs. In other words, a separation of the stream of the combustion gas easily occurs when the combustion gas flows into the mixing duct since the shape of the mixing duct is rapidly expanded in the height direction (first direction) of the mixing duct. Accordingly, mixing of the combustion gas and the cooling gas is not made sufficiently uniform. In contrast with this, in the combustion gas cooling apparatus 100 which satisfies the conditional expression (2), the flow-separation and the flow-maldistribution of the stream of the combustion gas in the mixing duct 10 hardly occurs, and mixing of the combustion gas and the cooling gas is made uniform. Therefore, cooling can be performed with the temperature of the mixed gas which is supplied to the catalyst part 30 that decomposes nitrogen oxides made sufficiently uniform. Further, the cross-sectional area of the flow outlet 20b of the expanded duct 20 is sufficiently large, and therefore, the gas flows at a lower rate so that the pressure loss in the catalyst part 30 can be reduced.

As above, the combustion gas cooling apparatus 100 of the first embodiment satisfies the conditional expression (1), and/or satisfies the conditional expression (2). More specifically, the difference (H2−H1) of the maximum dimensions in the height direction of the flow inlet 10a and the flow outlet 10b with respect to the passage length L1 of the mixing duct 10 is smaller than the difference (H3−H2) of the maximum dimensions in the height direction of the flow inlet 20a and the flow outlet 20b with respect to the passage length L2 of the expanded duct 20, and/or the difference (W2−W1) of the maximum dimensions in the horizontal width direction of the flow inlet 10a and the flow outlet 10b of the inner surface of the mixing duct 10 is smaller than the difference (W3−W2) of the maximum dimensions in the horizontal width direction of the flow inlet 20a and the flow outlet 20b of the inner surface of the expanded duct 20.

When the difference (H2−H1) of the maximum dimensions in the vertical height direction of the flow inlet 10a and the flow outlet 10b with respect to the passage length L1 of the mixing duct 10 is smaller than the difference (H3−H2) of the maximum dimensions in the vertical height direction of the flow inlet 20a and the flow outlet 20b with respect to the passage length L2 of the expanded duct 20, less flow-separation and less flow-maldistribution of the stream of the combustion gas in the mixing duct 10 occurs as compared with the case in which the differences are equal, and mixing of the combustion gas and the cooling gas is made uniform. Therefore, cooling can be performed with the temperature distribution of the gas which is supplied to the catalyst part 30 that decomposes nitrogen oxides being made sufficiently uniform. Further, the cross-sectional area of the flow outlet 20b of the expanded duct 20 is sufficiently large, and therefore, the gas flows at a lower rate so that a pressure loss in the catalyst part 30 can be reduced.

Similarly, when the difference (W2−W1) of the maximum dimensions in the horizontal width direction of the flow inlet 10a and the flow outlet 10b of the inner surface of the mixing duct 10 is smaller than the difference (W3−W2) of the maximum dimensions in the horizontal width direction of the flow inlet 20a and the flow outlet 20b of the inner surface of the expanded duct 20, less flow-separation and less flow-maldistribution of the stream of the combustion gas in the mixing duct 10 occurs as compared with the case in which the differences are equal, and mixing of the combustion gas and the cooling gas is made uniform. Therefore, cooling can be performed with the temperature of the gas which is supplied to the catalyst part that decomposes nitrogen oxides being made sufficiently uniform. Further, the cross-sectional area of the flow outlet 20b of the expanded duct 20 is sufficiently large, and therefore, the gas flows at a lower rate so that a pressure loss in the catalyst part 30 can be reduced.

Further, in the combustion gas cooling apparatus 100 of the first embodiment, the difference (H2−H1) of the maximum dimensions in the height direction of the flow inlet 10a and the flow outlet 10b with respect to the passage length L1 of the mixing duct 10 is smaller than the difference (H3−H2) of the maximum dimensions in the height direction of the flow inlet 20a and the flow outlet 20b with respect to the passage length L2 of the expanded duct 20, and the difference (W2−W1) of the maximum dimensions in the width direction of the flow inlet 10a and the flow outlet 10b of the mixing duct 10 with respect to the passage length L1 of the mixing duct 10 is equal to the difference (W3−W2) of the maximum dimensions in the width direction of the flow inlet 20a and the flow outlet 20b with respect to the passage length L2 of the expanded duct 20 (also expressed as conditional expression 3: (W2−W1)/L1=(W4"−W3")/L2). Accordingly, less flow-separation and less flow-maldistribution of the stream of the combustion gas in the mixing duct 10 occurs, mixing of the combustion gas and the cooling gas is made uniform, and cooling can be performed with the temperature distribution of the gas which is supplied to the catalyst part that decomposes nitrogen oxides being made sufficiently uniform. Further, the cross-sectional area of the flow outlet 20b of the expanded duct 20 is sufficiently large, and therefore, the gas flows at a lower rate so that the pressure loss in the catalyst part 30 can be reduced.

Further, in the combustion gas cooling apparatus 100 of the first embodiment, the maximum dimension in the height direction of the mixing duct 10 from the flow inlet 10a to the flow outlet 10b is constant (H1 and H2 are equal). In this manner, cooling can be performed with the temperature distribution of the gas which is supplied to the catalyst part that decomposes nitrogen oxides being made sufficiently uniform while the maximum dimension in the height direction of the mixing duct 10 is made constant. In other words, less flow-separation and less flow-maldistribution of the stream of the combustion gas occurs since a separation of the stream of the combustion gas is suppressed at minimum when the combustion gas flows from the inlet duct 50 into the mixing duct 10. Further, the cross-sectional area of the flow outlet 20b of the expanded duct 20 is sufficiently large, and the gas flows at a lower rate so that the pressure loss in the catalyst part 30 can be reduced.

Further, in the combustion gas cooling apparatus 100 of the first embodiment, a plurality of cooling ducts (40a to 40d) are disposed at intervals in the height direction of the mixing duct 10. In this manner, the cooling efficiency of the combustion gas is enhanced, and cooling can be performed with the temperature distribution of the gas which is supplied to the catalyst part 30 that decomposes nitrogen oxides being sufficiently uniform.

Further, in the combustion gas cooling apparatus 100 of the first embodiment, the center position in the height direction of the flow outlet 20b of the expanded duct 20 is higher than the center position in the height direction of the flow outlet 10b of the mixing duct 10. In this manner, the outer wall surface of any one of the mixing duct 10 and the expanded duct 20 can be disposed on the same plane (for example, on the ground surface).

Further, the combustion gas cooling apparatus 100 of the first embodiment has a blowing part which blows the reducing agent such as ammonia for subjecting the mixed gas passing thorough the catalyst part 30 to reduction reaction into the expanded duct 20. In this manner, the reducing agent can be blown into the mixed gas at a suitable position.

Further, the combustion gas cooling apparatus 100 of the first embodiment carries out a combustion gas cooling method by carrying out the following steps.

More specifically, the combustion gas cooling apparatus 100 carries out a step of causing the combustion gas to flow into the mixing duct 10, a step of causing the cooling gas to flow out via the cooling duct 40 which causes the cooling gas at a lower temperature than the combustion gas to flow out into the mixing duct 10, and generating the mixed gas so that the temperature of the mixed gas in which the combustion gas and the cooling gas are mixed becomes a temperature of 300° C. to 500° C. inclusive, a step of causing the mixed gas to flow into the expanded duct 20, and a step of causing the mixed gas to flow into the catalyst part 30 which decomposes nitrogen oxides contained in the mixed gas.

In the first embodiment, the configuration in which the temperature of the combustion gas generated by combustion in the gas turbine 1 is 500° C. or higher, and the combustion gas is cooled until the temperature of the combustion gas becomes 300° C. to 500° C. inclusive is described, but even when the temperature of the combustion gas is within the temperature range of, for example, 500° C. to 550° C., a sufficient effect can be obtained. For example, the combustion gas at 500° C. is cooled until the temperature of the combustion gas becomes 300° C. to 470° C. inclusive, whereby the temperature distribution of the mixed gas is improved, and the performance of the catalyst can be sufficiently exhibited.

Second Embodiment

Figure 9:
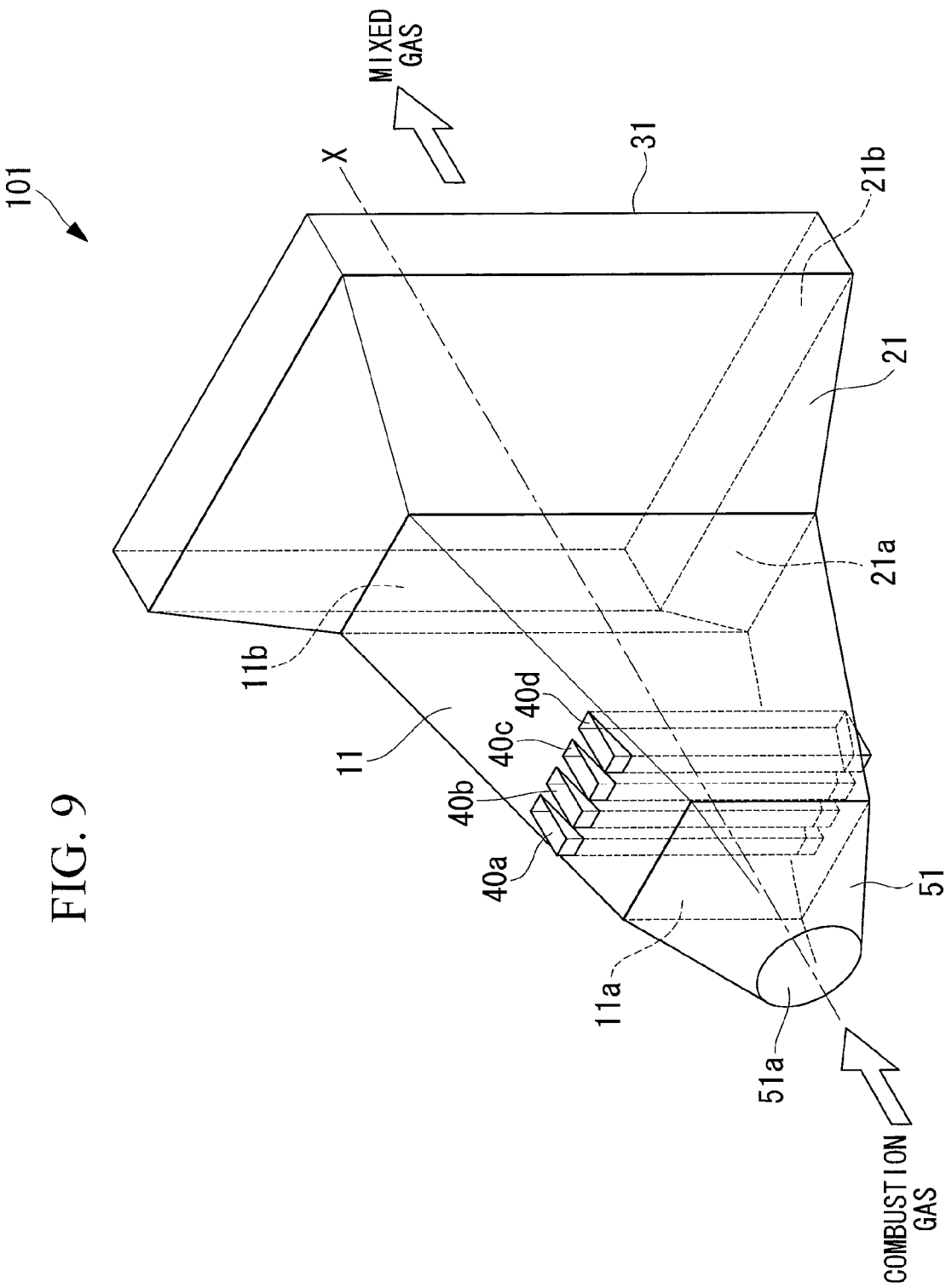
FIG. 9 is a perspective view of a combustion gas cooling apparatus of a second embodiment.
Figure 10:
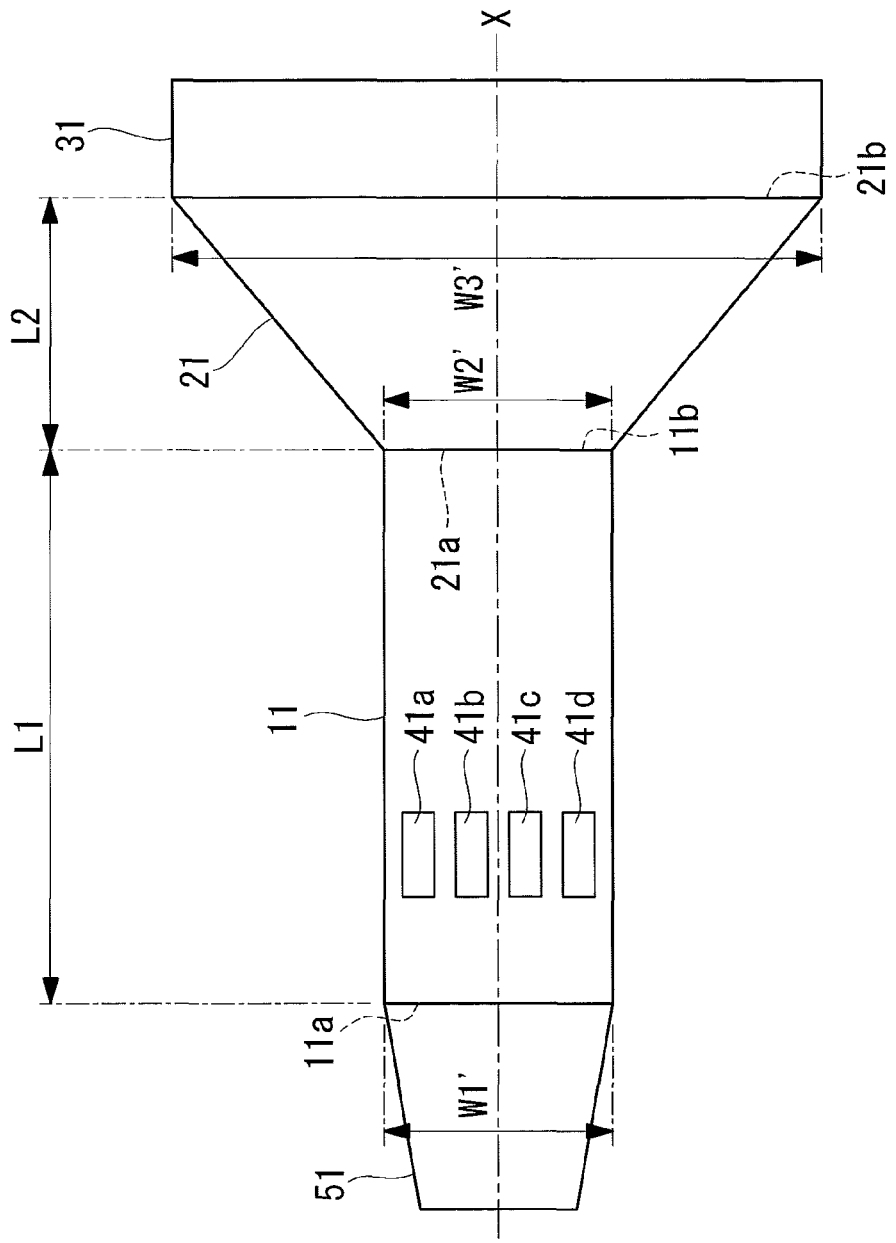
FIG. 10 is a plan view of the combustion gas cooling apparatus of the second embodiment seen from above.
Figure 11:
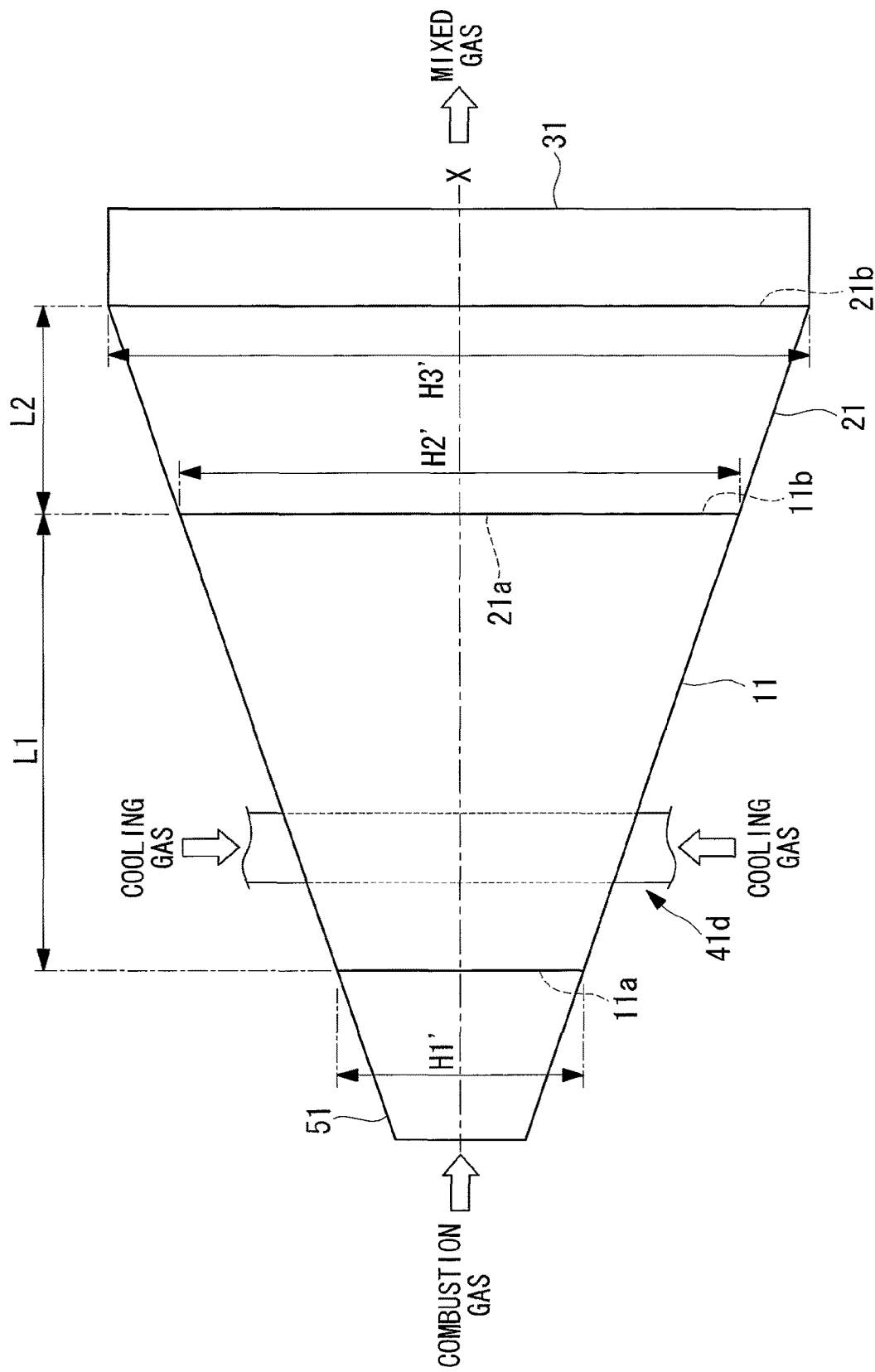
FIG. 11 is a side view of the combustion gas cooling apparatus of the second embodiment seen from a right side.

Next, a second embodiment of the present invention will be described with use of FIG. 9 to FIG. 11. FIG. 9 is a perspective view of a combustion gas cooling apparatus 101 of the second embodiment. FIG. 10 is a plan view of the combustion gas cooling apparatus 101 seen from above. FIG. 11 is a side view of the combustion gas cooling apparatus 101 seen from a right side. In FIG. 9 to FIG. 11, the components assigned with the same reference signs have the same configurations. Further, the arrows in FIG. 9 to FIG. 11 indicate the flow directions of gases (a combustion gas, a mixed gas).

The combustion gas cooling apparatus 100 of the first embodiment includes the mixing duct 10 in which the maximum dimension of the passage in the width direction is longer than the maximum dimension of the passage in the height direction, and has the cooling ducts 40 penetrated in the width direction of the mixing duct 10 (refer to FIG. 1).

In contrast with this, the combustion gas cooling apparatus 100 of the second embodiment includes a mixing duct 11 in which a maximum dimension of a passage in a height direction is longer than a maximum dimension of the passage in a width dimension, and has cooling ducts 41 penetrated in the height direction of the mixing duct 11. Note that the width direction (first direction) of the mixing duct 10 is a direction substantially horizontal to a plane, for example a ground, on which ducts (the mixing duct 11, the expanded duct 21, and the inlet duct 51) are disposed.

The combustion gas cooling apparatus 101 of FIG. 9 corresponds to the combustion gas cooling apparatus 100 of FIG. 1. Further, the mixing duct 11 of FIG. 9 corresponds to the mixing duct 10 of FIG. 1. Further, an expanded duct 21 of FIG. 9 corresponds to the expanded duct 20 of FIG. 1. Further, a catalyst part 31 of FIG. 9 corresponds to the catalyst part 30 of FIG. 1. Further, an inlet duct 51 of FIG. 9 corresponds to the inlet duct 50 of FIG. 1. Further, a cooling duct 41 of FIG. 9 corresponds to the cooling duct 40 of FIG. 1. Except for the portions especially described as follows, the mixing duct 11, the expanded duct 21, the catalyst part 31, the inlet duct 51 and the cooling duct 41 are the same as the corresponding components of FIG. 1, respectively, and therefore, the description thereof will be omitted.

Though each configuration of the second embodiment corresponds to each configuration of the first embodiment, the second embodiment and the first embodiment differ in that the mixing duct 11 is in a shape different from the mixing duct 10, the expanded duct 21 is in a different shape from the expanded duct 20, and the disposing direction of the cooling ducts 41 differs from the disposing direction of the cooling ducts 40.

As shown in FIG. 10 and FIG. 11, a passage length (length along a flow direction of the combustion gas) of the mixing duct 11 is L1, and a passage length (length along the flow direction of the combustion gas) of the expanded duct 21 is L2. Further, as shown in FIG. 10, a maximum dimension in a horizontal width direction (first direction) of a flow inlet 11a of an inner surface of the mixing duct 11 is W1', and a maximum dimension in a horizontal width direction (first direction) of a flow outlet 11b of the inner surface of the mixing duct 11 is W2'. The maximum dimension in the horizontal width direction (first direction) of a flow inlet 21a of the inner surface of the expanded duct 21 is W2', and a maximum dimension in the horizontal width direction (first direction) of a flow outlet 21b of the inner surface of the expanded duct 21 is W3'.

Further, as shown in FIG. 11, a maximum dimension in a height direction (second direction substantially orthogonal to first direction) of the flow inlet 11a with respect to the flow length L1 of the mixing duct 11 is H1', and a dimension in the height direction (second direction) of the flow outlet 11b with respect to the flow length L1 of the mixing duct 11 is H2'. A dimension in the height direction (second direction) of the flow inlet 21a with respect to the flow length L2 of the expanded duct 21 is H2', and a maximum dimension in the height direction (second direction) of the flow outlet 20b with respect to the passage length L2 of the expanded duct 20 is H3'.

The shapes of the mixing duct 11 and the expanded duct 21 of the second embodiment are the shapes which satisfy the conditional expression (2) of the first embodiment.

More specifically, in the combustion gas cooling apparatus 101 the plan view of which is shown in FIG. 10, the maximum dimension W2' in the horizontal width direction (first direction) of the flow inlet 21a of the inner surface of the expanded duct 21 and the maximum dimension W1' in the horizontal width direction (first direction) of the flow inlet 11a of the inner surface of the mixing duct 11 are equal to each other. Further, the maximum dimension W3' in the horizontal width direction (first direction) of the flow outlet 21b of the inner surface of the expanded duct 21 is larger than the maximum dimension W2' in the horizontal width direction (first direction) of the flow inlet 21a of the inner surface of the expanded duct 21. Accordingly, the combustion gas cooling apparatus 101 the plan view of which is shown in FIG. 10 satisfies the conditional expression (2).

The conditional expression (2) is satisfied, and therefore, the difference (W2'-W1') of the maximum dimensions in the horizontal width direction of the flow inlet 11a and the flow outlet 11b of the inner surface of the mixing duct 11 becomes smaller than the difference (W3'-W2') of the maximum dimensions in the horizontal width direction of the flow inlet 21a and the flow outlet 21b of the inner surface of the expanded duct 21.

In the combustion gas cooling apparatus 101 shown in FIG. 10, less flow-separation and less flow-maldistribution of the stream of the combustion gas in the mixing duct 11 occurs, and mixing of the combustion gas and the cooling gas is made uniform. Therefore, cooling can be performed with the temperature of the mixed gas which is supplied to the catalyst part 31 that decomposes nitrogen oxides being made sufficiently uniform. Further, the cross-sectional area of the flow outlet 21b of the expanded duct 21 is sufficiently large, and therefore, the gas flows at a lower rate so that a pressure loss in the catalyst part 31 can be reduced.

The combustion gas cooling apparatus 101 shown in FIG. 10 and FIG. 11 satisfies the conditional expression (2), but the combustion gas cooling apparatus 101 may be in the shape which satisfies the conditional expression (1) of the first embodiment as well as the conditional expression (2), or instead of the conditional expression (2).

When the conditional expression (1) is satisfied, the difference (H2'-H1') of the maximum dimensions in the height direction of the flow inlet 11a and the flow outlet 11b with respect to the passage length L1 of the mixing duct 11 is smaller than the difference (H3'-H2') of the maximum dimensions in the height direction of the flow inlet 21a and the flow outlet 21b with respect to the passage length L2 of the expanded duct 21.

In the mixing duct in which the height increases with a constant gradient, flow-separation and flow-maldistribution of the stream of the combustion gas easily occurs. In other words, a separation of the stream of the combustion gas easily occurs when the combustion gas flows into the mixing duct since the shape of the mixing duct in which the height increases with a constant gradient is rapidly expanded in the height direction (second direction) of the mixing duct. Accordingly, mixing of the combustion gas and the cooling gas is not made sufficiently uniform. In contrast with this, in the combustion gas cooling apparatus 101 which satisfies the conditional expression (1), less flow-separation and less flow-maldistribution of the stream of the combustion gas in the mixing duct 11 occurs, and mixing of the combustion gas and the cooling gas is made uniform. Therefore, cooling can be performed with the temperature of the mixed gas which is supplied to the catalyst part 31 that decomposes nitrogen oxides being made sufficiently uniform. Further, the cross-sectional area of the flow outlet 21b of the expanded duct 21 is sufficiently large, and therefore, the gas flows at a lower rate so that the pressure loss in the catalyst part 31 can be reduced.

As above, the combustion gas cooling apparatus 101 of the second embodiment satisfies the conditional expression (2), and/or satisfies the conditional expression (1). More specifically, the difference (H2'-H1') of the maximum dimensions in the height direction of the flow inlet 11a and the flow outlet 11b with respect to the passage length L1 of the mixing duct 11 is smaller than the difference (H3'-H2') of the maximum dimensions in the height direction of the flow inlet 21a and the flow outlet 21b with respect to the passage length L2 of the expanded duct 21, and/or the difference (W2'-W1') of the maximum dimensions in the horizontal width direction of the flow inlet 11a and the flow outlet 11b of the inner surface of the mixing duct 11 is smaller than the difference (W3'-W2') of the maximum dimensions in the horizontal width direction of the flow inlet 21a and the flow outlet 21b of the inner surface of the expanded duct 21.

When the difference (H2'-H1') of the maximum dimensions in the height direction of the flow inlet 11a and the flow outlet 11b with respect to the passage length L1 of the mixing duct 11 is smaller than the difference (H3'-H2') of the maximum dimensions in the height direction of the flow inlet 21a and the flow outlet 21b with respect to the passage length L2 of the expanded duct 21, less flow-separation and less flow-maldistribution of the stream of the combustion gas in the mixing duct 11 occurs as compared with the case in which the differences are equal, and mixing of the combustion gas and the cooling gas is made uniform. Therefore, cooling can be performed with the temperature distribution of the gas which is supplied to the catalyst part 31 that decomposes nitrogen oxides being made sufficiently uniform. Further, the cross-sectional area of the flow outlet 21b of the expanded duct 21 is sufficiently large, and therefore, the gas flows at a lower rate so that the pressure loss in the catalyst part 31 can be reduced.

Similarly, when the difference (W2'-W1') of the maximum dimensions in the horizontal width direction of the flow inlet 11a and the flow outlet 11b of the inner surface of the mixing duct 11 is smaller than the difference (W3'-W2') of the maximum dimensions in the horizontal width direction of the flow inlet 21a and the flow outlet 21b of the inner surface of the expanded duct 21, less flow-separation and less flow-maldistribution of the stream of the combustion gas in the mixing duct 11 occurs as compared with the case in which the differences are equal, and mixing of the combustion gas and the cooling gas is made uniform. Therefore, cooling can be performed with the temperature of the gas which is supplied to the catalyst part that decomposes nitrogen oxides being made sufficiently uniform. Further, the cross-sectional area of the flow outlet 21b of the expanded duct 21 is sufficiently large, and therefore, the gas flows at a lower rate so that the pressure loss in the catalyst part 31 can be reduced.

Further, in the combustion gas cooling apparatus 101 of the second embodiment, the difference (H2'-H1') of the maximum dimensions in the height direction of the flow inlet 11a and the flow outlet 11b with respect to the passage length L1 of the mixing duct 11 is equal to the difference (H3'-H2') of the maximum dimensions in the height direction of the flow inlet 21a and the flow outlet 21b with respect to the passage length L2 of the expanded duct 21 (also expressed as conditional expression 4: (H2−H1)/L1=(H4"−H3")/L2), and the difference (W2'-W1') of the maximum dimensions in the horizontal width direction of the flow inlet 11a and the flow outlet 11b of the inner surface of the mixing duct 11 with respect to the passage length L1 of the mixing duct 11 is smaller than the difference (W3'−W2') of the maximum dimensions in the horizontal width direction of the flow inlet 21a and the flow outlet 21b of the inner surface of the expanded duct 21.

When the difference (W2'−W1') of the maximum dimensions in the horizontal width direction of the flow inlet 11a and the flow outlet 11b of the inner surface of the mixing duct 11 is smaller than the difference (W3'−W2') of the maximum dimensions in the horizontal width direction of the flow inlet 21a and the flow outlet 21b of the inner surface of the expanded duct 21, less flow-separation and less flow-maldistribution of the stream of the combustion gas in the mixing duct 11 occurs as compared with the case in which the differences are equal, and mixing of the combustion gas and the cooling gas is made uniform. Therefore, cooling can be performed with the temperature distribution of the gas which is supplied to the catalyst part 31 that decomposes nitrogen oxides being made sufficiently uniform. Further, the cross-sectional area of the flow outlet 21b of the expanded duct 21 is sufficiently large, and therefore, the gas flows at a lower rate so that the pressure loss in the catalyst part 31 can be reduced.

Further, in the combustion gas cooling apparatus 101 of the second embodiment, the maximum dimension in the horizontal width direction of the inner surface of the mixing duct 11 from the flow inlet 11a to the flow outlet 11b is constant (W1' and W2' are equal). In this manner, cooling can be performed with the temperature distribution of the gas which is supplied to the catalyst part that decomposes nitrogen oxides being made sufficiently uniform, while the maximum dimension in the width direction of the mixing duct 11 is made constant. In other words, less flow-separation and less flow-maldistribution of the stream of the combustion gas occurs since a separation of the stream of the combustion gas is suppressed when the combustion gas flows from the inlet duct 51 into the mixing duct 11. Further, the cross-sectional area of the flow outlet 21b of the expanded duct 21 is sufficiently large, and the gas flows at a lower rate so that the pressure loss in the catalyst part 31 can be reduced.

Further, in the combustion gas cooling apparatus 101 of the second embodiment, a plurality of cooling ducts (41a to 41d) are disposed at intervals in the width direction of the mixing duct 11. In this manner, the cooling efficiency of the combustion gas is enhanced, and cooling can be performed with the temperature distribution of the gas which is supplied to the catalyst part 31 that decomposes nitrogen oxides being sufficiently uniform.

Further, in the fuel gas cooling apparatus 101 of the second embodiment, a center position in the height direction of the flow outlet 21b of the expanded duct 21, and a center position in the height direction of the flow outlet 11b of the mixing duct 11 are present on the same center axis X, as shown in FIG. 9 to FIG. 11. More specifically, the center position in the height direction of the flow outlet 21b of the expanded duct 21 corresponds to the center position in the height direction of the flow outlet 11b of the mixing duct 11. In this manner, the center position in the height direction of the flow outlet 21b and the center position in the height direction of the flow outlet 11b are caused to correspond to each other, and nonuniformity of the velocity distribution of the mixed gas which flows in the expanded duct 21 can be reduced.

REFERENCE SIGNS LIST 10, 11 mixing duct (first duct)
10a flow inlet
10b flow outlet
20, 21 expanded duct (second duct)
20a flow inlet
20b flow outlet
30, 31 catalyst part
40, 41 cooling duct
50, 51 inlet duct
50a flow inlet
50b flow outlet
60 cooling gas outflow aperture (cooling gas flow outlet)
100, 101 combustion gas cooling apparatus

The invention claimed is:

1. A combustion gas cooling apparatus, comprising:
a first duct including a first flow inlet into which a combustion gas travels, and a first flow outlet which allows the combustion gas traveling from the first flow inlet to exhaust;
a cooling duct arranged in the first duct which introduces a cooling gas to the first duct at a temperature lower than the combustion gas to generate a mixed gas in which the combustion gas and the coolant gas are mixed; and
a second duct including a second flow inlet which is connected to the first duct and into which flow the mixed gas, and a second flow outlet which allows the mixed gas flowing from the second flow inlet to flow out,
wherein conditional expression (1") is satisfied:

$$(H2-H1)/L1 < (H4''-H3'')/L2 \quad (1'')$$

wherein H1 is maximum width of the first flow inlet in a first direction orthogonal to the combustion gas flow; H2 is maximum width of the first flow outlet in the first direction; H3" is maximum width of the second flow inlet in the first direction; H4" is maximum width of the second flow outlet in the first direction; L1 is passage length of the first duct and L2 is passage length of the second duct; and
wherein (H2−H1) in expression (1") is a non-negative value and (H4"−H3") in expression (1") is a positive value.

2. The combustion gas cooling apparatus according to claim 1, wherein conditional expression (3) is satisfied:

$$(W2-W1)/L1 = (W4''-W3'')/L2 \quad (3)$$

wherein W1 is maximum width of the first flow inlet in a second direction orthogonal to the combustion gas flow and substantially orthogonal to the first direction; W2 is maximum width of the first flow outlet in the second direction; W3" is maximum width of the second flow inlet in the second direction; W4" is maximum width of the second flow outlet in the second direction; L1 is passage length of the first duct and L2 is passage length of the second duct; and
wherein (W2−W1) and (W4"−W3") in expression (3) are positive values.

3. The combustion gas cooling apparatus according to claim 2, wherein maximum width in the first direction of the first duct from the first flow inlet to the first flow outlet is constant.

4. The combustion gas cooling apparatus according to claim 2, wherein a plurality of the cooling ducts are installed at intervals in the first direction.

5. The combustion gas cooling apparatus according to claim 1, wherein a center position in the maximum width of the second flow outlet in the first direction is higher than a center position in the maximum width of the first flow outlet in the first direction.

6. The combustion gas cooling apparatus according to claim 1, wherein a center position in the maximum width of the second flow outlet in the first direction corresponds to a center position in the maximum width of the first flow outlet in the first direction.

7. The combustion gas cooling apparatus according to claim 1, wherein temperature of the combustion gas which flows into the first duct inlet is 500° C. or higher.

8. The combustion gas cooling apparatus according to claim 1, wherein as the cooling gas which is introduced to the first duct from the cooling duct, air in atmosphere is used.

9. The combustion gas cooling apparatus according to claim 1, further comprising:
a catalyst part provided downstream of the second duct, and
a blowing part arranged downstream of the second flow inlet of the second duct and upstream of the catalyst part and which blows a reducing agent into the mixed gas.

10. A denitration apparatus, comprising:
the combustion gas cooling apparatus according to claim 1; and
a catalyst part which is provided downstream of the second duct, decomposes nitrogen oxides contained in the mixed gas exhausted from the second duct, and discharges the mixed gas in which the nitrogen oxides are decomposed,
wherein temperature of the mixed gas at an inlet of the catalyst part is 300° C. to 500° C. inclusive.

11. The denitration apparatus according to claim 10, further comprising:
a blowing part arranged downstream of the second flow inlet of the second duct and upstream of the catalyst part and which blows a reducing agent into the mixed gas.

12. A combustion gas cooling method, comprising the steps of:
introducing a combustion gas to flow into a first duct including a first flow inlet into which the combustion gas travels, and a first outlet which allows the combustion gas flowing in from the first flow inlet to exhaust;
injecting a cooling gas from a cooling duct which causes the coolant gas at a temperature lower than the combustion gas to flow into the first duct, and generating a mixed gas in which the combustion gas and the cooling gas are mixed so that temperature of the mixed gas falls within a predetermined temperature range; and
introducing the mixed gas to flow into a second duct which includes a second flow inlet into which the mixed gas exhausted from the first flow outlet of the first duct travels, and a second flow outlet which allows the mixed gas flowing in from the second flow inlet to exhaust,
wherein conditional expression (1″) is satisfied:

$$(H2-H1)/L1 < (H4''-H3'')/L2 \qquad (1'')$$

wherein H1 is maximum width of the first flow inlet in a first direction orthogonal to the combustion gas flow; H2 is maximum width of the first flow outlet in the first direction; H3″ is maximum width of the second flow inlet in the first direction; H4″ is maximum width of the second flow outlet in the first direction; L1 is passage length of the first duct; and L2 is passage length of the second duct; and
wherein (H2−H1) in expression (1″) is a non-negative value and (H4″−H3″) in expression (1″) is a positive value.

13. The combustion gas cooling apparatus according to claim 1, wherein conditional expression (2″) is satisfied:

$$(W2-W1)/L1 < (W4''-W3'')/L2 \qquad (2'')$$

wherein W1 is maximum width of the first flow inlet in a second direction orthogonal to the combustion gas flow and substantially orthogonal to the first direction; W2 is maximum width of the first flow outlet in the second direction; W3″ is maximum width of the second flow inlet in the second direction; W4″ is maximum width of the second flow outlet in the second direction; L1 is passage length of the first duct; and L2 is passage length of the second duct; and
wherein (W2−W1) in expression (2″) is a non-negative value and (W4″−W3″) in expression (2″) is a positive value.

14. The combustion gas cooling method according to claim 12, wherein conditional expression (2″) is satisfied:

$$(W2-W1)/L1 < (W4''-W3'')/L2 \qquad (2'')$$

wherein W1 is maximum width of the first flow inlet in a second direction orthogonal to the combustion gas flow and substantially orthogonal to the first direction; W2 is maximum width of the first flow outlet in the second direction; W3″ is maximum width of the second flow inlet in the second direction; W4″ is maximum width of the second flow outlet in the second direction; L1 is passage length of the first duct; and L2 is passage length of the second duct; and
wherein (W2−W1) in expression (2″) is a non-negative value and (W4″−W3″) in expression (2″) is a positive value.

15. A combustion gas cooling apparatus, comprising:
a first duct including a first flow inlet into which a combustion gas travels, and a first flow outlet which allows the combustion gas traveling from the first flow inlet to exhaust;
a cooling duct arranged in the first duct which introduces a cooling gas to the first duct at a temperature lower than the combustion gas to generate a mixed gas in which the combustion gas and the coolant gas are mixed; and
a second duct including a second flow inlet which is connected to the first duct and into which flow the mixed gas, and a second flow outlet which allows the mixed gas flowing from the second flow inlet to flow out,
wherein conditional expressions (2″) and (4) are satisfied:

$$(W2-W1)/L1 < (W4''-W3'')/L2 \qquad (2'')$$

$$(H2-H1)/L1 = (H4''-H3'')/L2 \qquad (4)$$

wherein H1 is maximum width of the first flow inlet in a first direction orthogonal to the combustion gas flow; H2 is maximum width of the first flow outlet in the first direction; H3″ is maximum width of the second flow inlet in the first direction; H4″ is maximum width of the second flow outlet in the first direction; W1 is maximum width of the first flow inlet in a second direction orthogonal to the combustion gas flow and substantially orthogonal to the first direction; W2 is maximum width of the first flow outlet in the second direction; W3″ is maximum width of the second flow inlet in the second direction; W4″ is maximum width of the second flow outlet in the second direction; L1 is passage length of the first duct; and L2 is passage length of the second duct; and wherein (H2−H1) and (H4″−H3″) in expression (4) are positive values, and wherein (W2−W1) in expression (2″) is a non-negative value and (W4″−W3″) in expression (2″) is a positive value.

16. The combustion gas cooling apparatus according to claim 15, wherein maximum width in the second direction of the first duct from the first flow inlet to the first flow outlet is constant.

17. The combustion gas cooling apparatus according to claim 15, wherein a plurality of the cooling ducts are installed at intervals in the second direction.

* * * * *